(12) United States Patent
Yamane et al.

(10) Patent No.: US 11,303,224 B2
(45) Date of Patent: Apr. 12, 2022

(54) INVERTER DEVICE WITH HIGH FOLLOW-UP CAPABILITY

(71) Applicant: KABUSHIKI KAISHA TOYOTA JIDOSHOKKI, Kariya (JP)

(72) Inventors: Kazuki Yamane, Aichi-ken (JP); Masamichi Nawa, Aichi-ken (JP)

(73) Assignee: KABUSHIKI KAISHA TOYOTA JIDOSHOKKI, Kariya (JP)

(\*) Notice: Subject to any disclaimer, the term of this patent is extended or adjusted under 35 U.S.C. 154(b) by 0 days.

(21) Appl. No.: 16/963,631

(22) PCT Filed: Jan. 15, 2019

(86) PCT No.: PCT/JP2019/000815
§ 371 (c)(1),
(2) Date: Jul. 21, 2020

(87) PCT Pub. No.: WO2019/146437
PCT Pub. Date: Aug. 1, 2019

(65) Prior Publication Data
US 2020/0382021 A1    Dec. 3, 2020

(30) Foreign Application Priority Data

Jan. 25, 2018 (JP) .............................. JP2018-010721
Sep. 11, 2018 (JP) .............................. JP2018-169641

(51) Int. Cl.
*H02M 7/5395* (2006.01)
*H02P 27/08* (2006.01)
*H02M 7/5387* (2007.01)

(52) U.S. Cl.
CPC ..... *H02M 7/5395* (2013.01); *H02M 7/53875* (2013.01); *H02P 27/08* (2013.01)

(58) Field of Classification Search
CPC ................. H02M 7/48; H02M 7/5395; H02M 7/5387–5395; H02P 27/08; H02P 27/06
See application file for complete search history.

(56) References Cited

U.S. PATENT DOCUMENTS 3,363,199 A     1/1968  Besslich
5,698,823 A *  12/1997  Tanahashi ................. H02P 3/22
                                                      187/296
(Continued)

FOREIGN PATENT DOCUMENTS

JP          2012-095412 A      5/2012

OTHER PUBLICATIONS

Sungho Jung et al., "Low Voltage Modulation Method in Six-step Operation of Three Phase Inverter", 9th International Conference on Power Electronics—ECCE Asia, Jun. 1-5, 2015, Seoul, Korea, pp. 605-610, XP033184235 (6 pages total).

(Continued)

*Primary Examiner* — Yusef A Ahmed
(74) *Attorney, Agent, or Firm* — Sughrue Mion, PLLC

(57) ABSTRACT

An inverter device includes an inverter circuit that has switching elements configuring an upper arm and a lower arm of each of U, V, W-phases, a signal generator that generates signals having waveforms corresponding to signals of U, V, W-phase command voltages, a first calculation unit that calculates an effective line voltage, a second calculation unit that generates a modulation voltage every control period, and a comparison unit that compares the signals with signals of the modulation voltage every control period, and outputs signals having pulse patterns which operate the switching elements of the upper arm and the switching element of the lower arm in the inverter circuit.

7 Claims, 13 Drawing Sheets

(56) References Cited

U.S. PATENT DOCUMENTS

| | | | | |
|---|---|---|---|---|
| 5,736,825 | A * | 4/1998 | Kaura | G05B 11/28 318/599 |
| 5,850,132 | A * | 12/1998 | Garces | G05B 11/28 318/599 |
| 5,905,644 | A * | 5/1999 | Blasko | H02P 21/36 363/41 |
| 5,912,813 | A * | 6/1999 | Kerkman | H02M 7/53875 363/98 |
| 6,023,417 | A * | 2/2000 | Hava | H02M 7/53875 363/41 |
| 6,088,246 | A * | 7/2000 | Okuyama | H02M 7/53873 363/41 |
| 6,373,219 | B1 * | 4/2002 | Obara | B60L 50/60 318/801 |
| 6,819,070 | B2 * | 11/2004 | Kerkman | H02M 7/53875 318/434 |
| 9,030,136 | B2 * | 5/2015 | Sugita | H02P 21/06 318/400.02 |
| 2001/0015904 | A1 * | 8/2001 | Kimura | H02M 7/538 363/131 |
| 2005/0073280 | A1 * | 4/2005 | Yoshinaga | H02P 29/50 318/727 |
| 2008/0231219 | A1 * | 9/2008 | Mori | H02P 3/22 318/434 |
| 2010/0060211 | A1 * | 3/2010 | Hashimoto | H02P 27/08 318/400.02 |
| 2011/0063883 | A1 * | 3/2011 | Hattori | H02M 7/53873 363/148 |
| 2011/0241585 | A1 * | 10/2011 | Naruse | B60L 15/007 318/400.09 |
| 2011/0273125 | A1 * | 11/2011 | Yamada | H02P 21/22 318/503 |
| 2012/0056569 | A1 * | 3/2012 | Takamatsu | B60L 15/08 318/400.26 |
| 2013/0033205 | A1 * | 2/2013 | Furukawa | H02P 21/0003 318/400.02 |
| 2013/0063058 | A1 * | 3/2013 | Shouji | H02P 21/22 318/400.06 |
| 2013/0307447 | A1 * | 11/2013 | Rozman | H02P 6/17 318/400.02 |
| 2014/0152214 | A1 * | 6/2014 | Furukawa | H02M 7/53875 318/400.13 |
| 2014/0333241 | A1 * | 11/2014 | Zhao | H02P 6/08 318/400.02 |
| 2015/0229247 | A1 * | 8/2015 | Nakai | B60L 15/025 318/400.02 |
| 2016/0105127 | A1 * | 4/2016 | Miyake | H02M 7/5395 363/97 |
| 2016/0126871 | A1 * | 5/2016 | Uematsu | H02P 6/15 318/400.02 |
| 2016/0197568 | A1 * | 7/2016 | Sung | H02P 6/18 318/400.13 |
| 2016/0294317 | A1 * | 10/2016 | Nakai | H02P 21/14 |
| 2017/0040922 | A1 * | 2/2017 | Fujishima | H02P 27/08 |
| 2017/0063274 | A1 * | 3/2017 | Mastrocola | H02P 29/02 |
| 2017/0294863 | A1 * | 10/2017 | Takahashi | H02P 21/22 |
| 2018/0159458 | A1 * | 6/2018 | Shouji | H02P 21/18 |
| 2019/0238063 | A1 * | 8/2019 | Irie | H02M 1/12 |
| 2019/0326837 | A1 * | 10/2019 | Fujishima | H02P 21/22 |
| 2020/0204057 | A1 * | 6/2020 | Kato | H02M 1/126 |

OTHER PUBLICATIONS

Aneesh Kumar A S et al., "Control Strategy to Naturally Balance Hybrid Converter for Variable-Speed Medium-Voltage Drive Applications", IEEE Transactions on Industrial Electronics, vol. 62, No. 2, Feb. 2015, pp. 866-876, XP011569229 (11 pages total).

Extended European Search Report dated Feb. 5, 2021 from the European Patent Office in EP Application No. 19744102.5.

* cited by examiner

FIG. 12
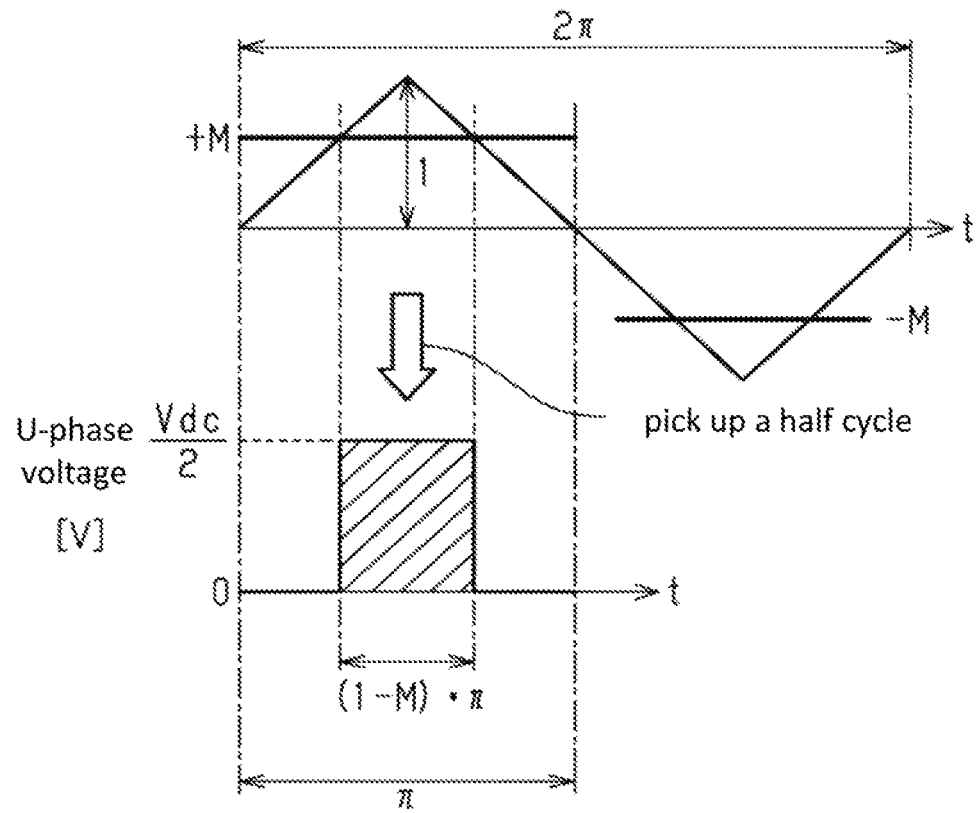
FIG. 13
(a) phase voltage (u)
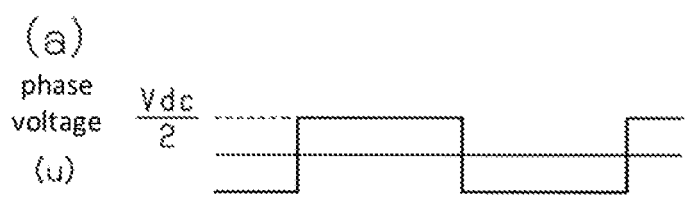
(b) line voltage
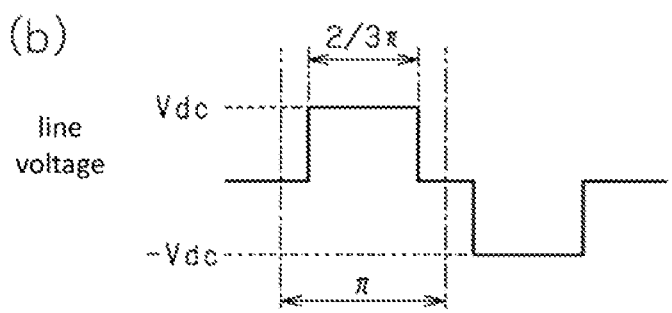

(a)           (b)

FIG. 17
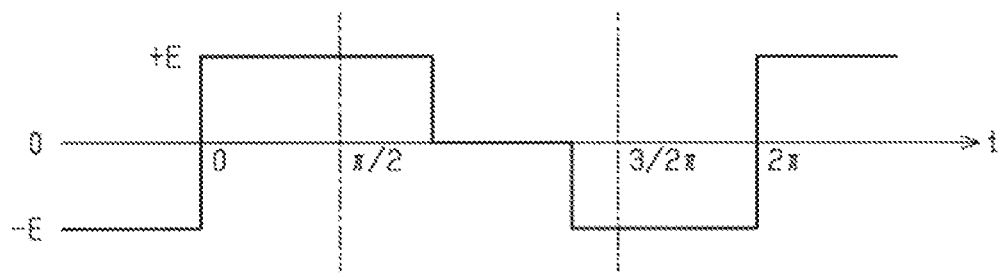
FIG. 18
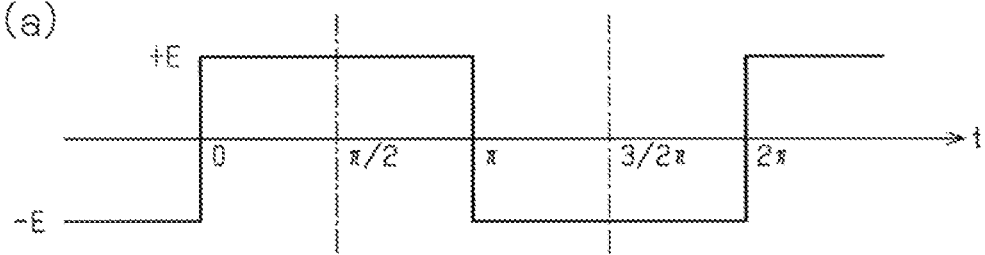
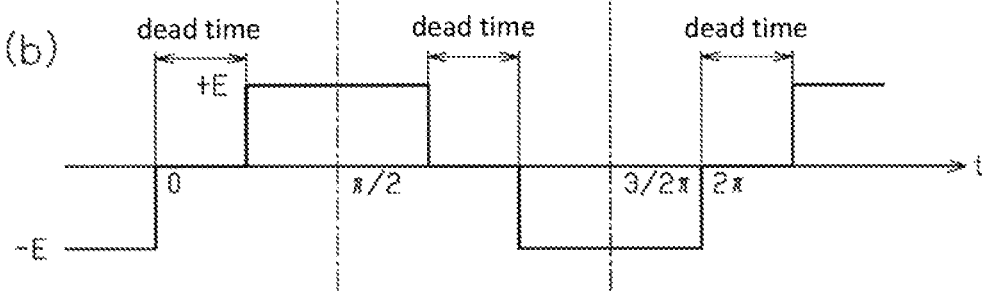

INVERTER DEVICE WITH HIGH FOLLOW-UP CAPABILITY

CROSS-REFERENCE TO RELATED APPLICATIONS

This application is a National Stage of International Application No. PCT/JP2019/000815 filed Jan. 15, 2019, claiming priority based on Japanese Patent Application No. 2018-010721 filed Jan. 25, 2018 and Japanese Patent Application No. 2018-169641 filed Sep. 11, 2018, the contents of all of which are incorporated herein by reference in their entirety.

TECHNICAL FIELD

The present invention relates to an inverter device.

BACKGROUND ART

The inverter device includes an inverter circuit that has switching elements connected between a negative bus and a positive bus and configuring upper and lower arms of each of U, V, and W-phases. A square wave drive (that is also called one pulse drive) is used to control an output of the inverter circuit. In the square wave drive, pulse patterns of upper arm switching elements of U, V, and W-phases and pulse patterns of lower arm switching elements of U, V, and W-phases are determined on the basis of information of an angle of a rotor. A phase voltage has a following relationship with a pulse pattern of an output of a pair of the upper and lower arm switching elements in the range of an electric angle 0 to $2\pi$ [rad]. While the upper arm switching element of U-phase is ON in the range of the electric angle 0 to $\pi$ [rad], the U-phase voltage is set to +E (E: direct current power source voltage). While the lower arm switching element of U-phase is ON in the range of the electric angle $\pi$ to $2\pi$ [rad], the U-phase voltage is set to –E. Similarly to the pulse pattern of U-phase, pulse patterns of V-phase and W-phase are generated. The pulse patterns of V-phase and W phase are phase-shifted by $\pm 2/3 T$ [rad] relative to the pulse pattern of the U-phase. Furthermore, in a square wave control, a dead time when both of a high-side switching element and a low-side switching element are OFF is sometimes set to be adjustable in order to set a modulation rate of an output voltage of a power conversion circuit to be variable, as disclosed in the Patent Document 1.

CITATION LIST

Patent Document

Patent Document 1: Japanese Patent Application Publication No. 2012-95412

SUMMARY OF INVENTION

Technical Problem

However, in a case where the dead time is designed to be small as illustrated in FIG. 18 at (a) or to be long as illustrated in FIG. 18 at (b), the inverter device has a low follow-up capability to a load fluctuation.

It is an objective of the present invention to provide an inverter device that has a high follow-up capability to a load fluctuation.

Solution to Problem

In the invention described in claim 1, an inverter device includes an inverter circuit that has switching elements connected between a negative bus and a positive bus and configuring an upper arm and a lower arm of each of U, V, W-phases, the inverter circuit converting a DC voltage to an AC voltage by switching operation of the switching elements and supplying the AC voltage to a motor, a signal generator that generates signals having waveforms corresponding to signals of U, V, W-phase command voltages on the basis of information of an angle, a d-axis command voltage, and a q-axis command voltage, a first calculation unit that receives signals of the d-axis command voltage and the q-axis command voltage, and calculates an effective line voltage, a second calculation unit that receives the effective line voltage calculated by the first calculation unit, and generates a modulation voltage every control period, and a comparison unit that compares the signals having the waveforms corresponding to the signals of the U, V, W-phase command voltages generated by the signal generator with signals of the modulation voltage generated by the second calculation unit every control period, and outputs signals having pulse patterns which operate the switching elements of the upper arm and the switching element of the lower arm in the inverter circuit.

According to the invention described in claim 1, the signal generator generates the signals having waveforms corresponding to signals of U, V, W-phase command voltages on the basis of the information of the angle, the d-axis command voltage, and the q-axis command voltage. The first calculation unit receives the signals of the d-axis command voltage and the q-axis command voltage, and calculates an effective line voltage. The second calculation unit receives the effective line voltage calculated by the first calculation unit, and generates the modulation voltage every control period. The comparison unit compares the signals having the waveforms corresponding to the signals of the U, V, W-phase command voltages generated by the signal generator with the signals of the modulation voltage generated by the second calculation unit every control period, and outputs signals having pulse patterns which operate the switching elements of the upper arm and the switching element of the lower arm in the inverter circuit. Accordingly, the modulation voltage M is generated by the effective line voltage calculated from the d-axis command voltage and the q-axis command voltage every control period, and compared with the signals of the command voltages every control period. The inverter device has a high follow-up capability to the load fluctuation due to this configuration.

As described in claim 2, in the inverter device according to claim 1, the signal generator has a d, q/u, v, w transformation unit that performs a coordinate transformation from a two-phase system (d, q) with the d-axis command voltage and the q-axis command voltage to a three-phase system (u, v, w) with the U, V, W-phase command voltages on the basis of the information of the angle, and a scaling unit that scales the signals of the U, V, W-phase command voltages by a phase peak voltage of the U, V, W-phase command voltages having the effective line voltage in a range of –1 to +1. The second calculation unit generates signals of a positive modulation voltage in a range of 0 to 1 and a negative modulation voltage in a range of –1 to 0. The comparison unit compares the signals of U, V W-phase command voltage scaled by the phase peak voltage of the U, V, W-phase command voltage having the effective line voltage in the range of –1 to +1 with the signals of the positive modulation voltage in the range of 0 to 1 and the negative modulation voltage in the range of −1 to 0, and outputs the signals having the pulse patterns which operate the switching elements of the upper arm and indicate a comparison result of magnitude of the signals of the scaled U, V, W-phase command voltages and the positive modulation voltage in the range of 0 to +1, and the signals having the pulse patterns which operate the switching elements of the lower arm and indicate a comparison result of magnitude of the signals of the scaled U, V, W-phase command voltages and the negative modulation voltage in the range of −1 to 0.

As described in claim 3, in the inverter device according to claim 1, the signal generator generates signals of the U, V, W-phases each having a waveform of a triangle wave an amplitude of which is 1 on the basis of the information of the angle, the d-axis command voltage, and the q-axis command voltage. The second calculation unit generates signals of a positive modulation voltage in a range of 0 to 1 and a negative modulation voltage in a range of −1 to 0. The comparison unit compares the signals of the generated triangle wave with the signals of the positive modulation voltage in the range of 0 to 1 and the negative modulation voltage in the range of −1 to 0, and outputs the signals having the pulse patterns which operate the switching elements of the upper arm and indicate a comparison result of magnitude of the signals of the generated triangle wave and the positive modulation voltage in the range of 0 to +1, and the signals of the pulse patterns which operate the switching elements of the lower arm and indicate a comparison result of magnitude of the signals of the generated triangle wave and the negative modulation voltage in the range of −1 to 0.

As described in claim 4, in the inverter device according to claim 1, the signal generator generates signals of the U, V, W-phase each having a waveform of a sine wave an amplitude of which is 1 on the basis of the information of the angle, the d-axis command voltage, and the q-axis command voltage. The second calculation unit generates signals of a positive modulation voltage in a range of 0 to 1 and a negative modulation voltage in a range of −1 to 0. The comparison unit compares the signals of the generated sine wave with the signals of the positive modulation voltage in the range of 0 to 1 and the negative modulation voltage in the range of −1 to 0, and outputs the signals having the pulse patterns which operate the switching elements of the upper arm and indicate a comparison result of magnitude of the signals of the generated sine wave and the positive modulation voltage in the range of 0 to +1, and the signals of the pulse patterns which operate the switching elements of the lower arm and indicate a comparison result of magnitude of the signals of the generated sine wave and the negative modulation voltage in the range of −1 to 0.

As described in claim 5, in the inverter device according to any one of claims 2 to 4, the second calculation unit has an effective line voltage/effective phase voltage calculation unit that calculates the effective phase voltage from the effective line voltage, and a modulation voltage computing unit that computes the modulation voltage M from the effective phase voltage calculated by the effective line voltage/effective phase voltage calculation unit and the DC voltage by using a mathematical expression.

Advantageous Effects of Invention

According to the present invention, the inverter device has a high follow-up capability to a load fluctuation.

BRIEF DESCRIPTION OF DRAWINGS

FIG. 12 is a figure showing a waveform to explain the fourth embodiment.

FIG. 13 at (a) and (b) illustrates figures showing waveforms to explain a coefficient of a phase voltage.

FIG. 17 is a figure showing an output waveform of the inverter circuit.

FIG. 18 at (a) and (b) illustrates figures showing output waveforms of an inverter device to explain a technical problem.

DESCRIPTION OF EMBODIMENTS

First Embodiment

The following will describe an exemplary embodiment according to the present invention with reference to the figures.

Figure 1:
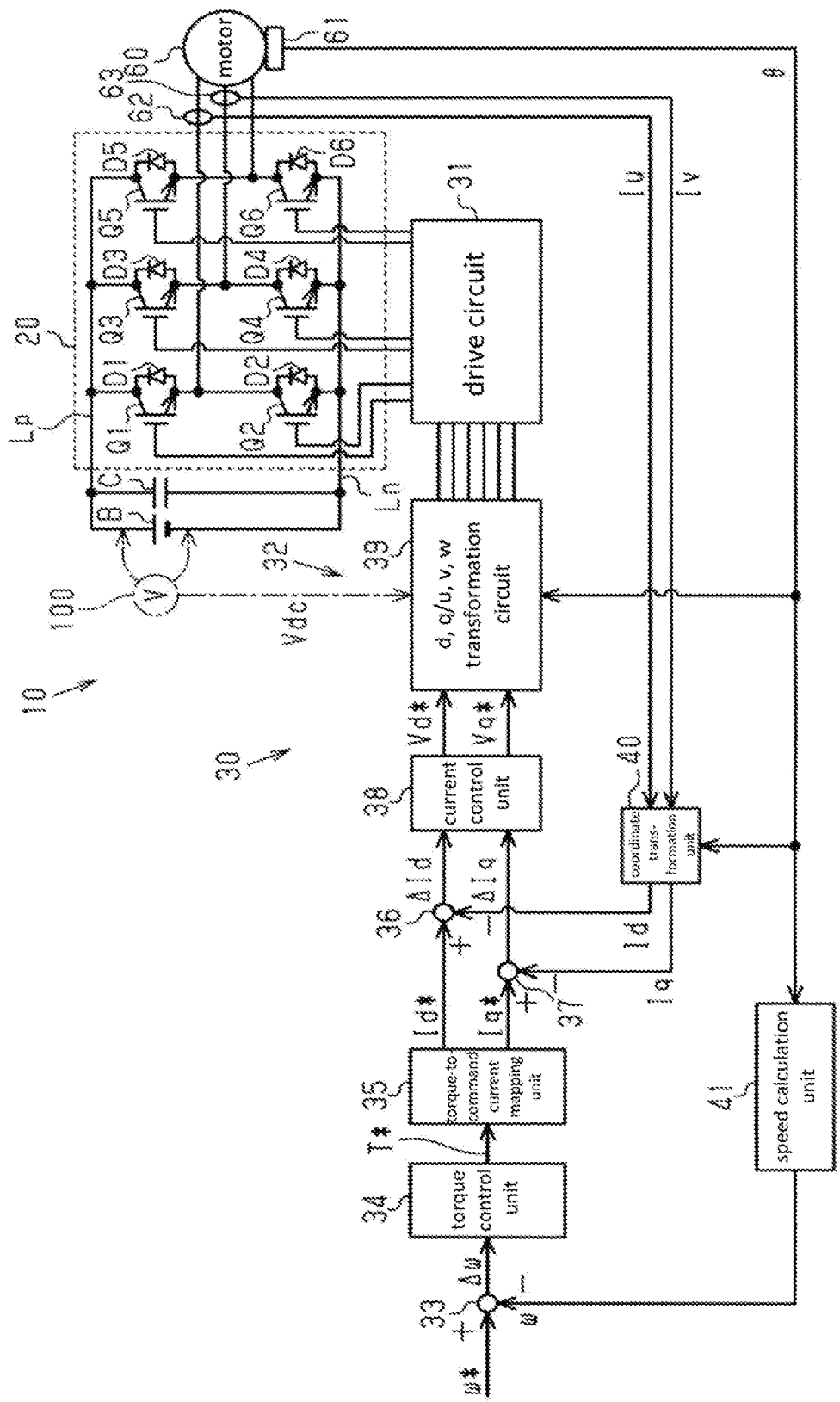
FIG. 1 is a block diagram showing a configuration of an inverter device according to an embodiment.

Referring to FIG. 1, an inverter device 10 includes an inverter circuit 20 and an inverter control device 30. The inverter control device 30 includes a drive circuit 31 and a controller 32.

The inverter circuit 20 includes six switching elements Q1 to Q6 and six diodes D1 to D6. IGBT is used as the switching elements Q1 to Q6. The switching element Q1 configuring a U-phase upper arm and the switching element Q2 configuring a U-phase lower arm are connected in series between a positive bus Lp and a negative bus Ln. The switching element Q3 configuring a V-phase upper arm and the switching element Q4 configuring a V-phase lower arm are connected in series between the positive bus Lp and the negative bus Ln. The switching element Q5 configuring a W-phase upper arm and the switching element Q6 configuring a W-phase lower arm are connected in series between the positive bus Lp and the negative bus Ln. Each of the switching elements Q1 to Q6 is connected in antiparallel with the corresponding one of diodes D1 to D6. A smoothing capacitor C is connected in parallel with a battery B as a DC power supply across the output terminals of the battery B. The output terminals of the battery B are connected to the positive bus Lp and the negative bus Ln, respectively.

A node between the switching element Q1 and the switching element Q2 is connected to a U-phase terminal of a motor 60. A node between the switching element Q3 and the switching element Q4 is connected to a V-phase terminal of the motor 60. A node between the switching element Q5 and the switching element Q is connected to a W-phase terminal of the motor 60. The inverter circuit 20, which has the switching elements Q1 to Q6 configuring the upper and lower arms, converts a DC voltage to an AC voltage by switching operation of the switching elements Q1 to Q6, and supplies the AC voltage to the motor 60, in which the DC voltage is a terminal voltage of the battery B. The driving motor for a vehicle is used as the motor 60.

The drive circuit 31 is connected to gate terminals of the switching elements Q1 to Q6. The drive circuit 31 switches the switching elements Q1 to Q6 of the inverter circuit 20 on and off depending on pulse patterns of control signals.

A position detection unit 61 is provided in the motor 60, and detects an electric angle θ indicating a rotational position of the motor 60. A current sensor 62 detects a U-phase current Iu of the motor 60. In addition, a current sensor 63 detects a V-phase current Iv of the motor 60.

The controller 32 is configured by a microcomputer, and has a subtractor 33, a torque control unit 34, a torque-to-command current mapping unit 35, a subtractor 36, a subtractor 37, a current control unit 38, a d, q/u, v, w transformation circuit 39, a coordinate transformation unit 40, and a speed calculation unit 41. A control period of the controller 32 configured by the microcomputer is a sampling period of the microcomputer which is at most about one tenth one period of signals of command voltages of the U-phase, the V-phase, and the W-phase W*, Vv, Vw (see FIG. 5 at (a)).

The speed calculation unit 41 calculates a speed w from the electric angle θ detected by the position detection unit 61. The subtractor 33 calculates a difference Δω between a command speed ω* and the speed ω calculated by the speed calculation unit 41. The torque control unit 34 calculates a command torque T* from the difference Δω of the speed ω.

The torque-to-command current mapping unit 35 receives the signal of the command torque T*, and generates signals of a d-axis command current Id* and a q-axis command current Iq*. For example, the operation of the torque-to-command current mapping unit 35 is performed by using a table in which a target torque previously stored in a storage unit (not shown) is mapped onto the d-axis command current Id* and the q-axis command current q.

The coordinate transformation unit 40 obtains a W-phase current Iw of the motor 60 from the U-phase current Iu and the V-phase current Iv measured by the current sensors 62 and 63, respectively, and performs coordinate transformation from three-phase system (u, v, w) with the U-phase current Iu, the V-phase current Iv, and the W-phase current Iw to two-phase system (d, q) with a d-axis current Id and a q-axis current Iq on the basis of the electric angle θ. It is noted that the d-axis current Id is a current vector component to generate the magnetic flux at the motor 60 and the q-axis current Iq is a current vector component to generate torque at the motor 60.

The subtractor 36 calculates a difference ΔId between the d-axis command current Id* and the d-axis current Id. The subtractor 37 calculates a difference ΔIq between the q-axis command current Iq* and the q-axis current Iq. The current control unit 38 calculates a d-axis command voltage Vd* and a q-axis command voltage Vq* on the basis of the difference ΔId and the difference ΔIq.

The d, q/u, v, w transformation circuit 39 receives the electric angle θ as information of the angle and signals of the d-axis command voltage Vd* and the q-axis command voltage Vq*, and outputs signals having pulse patterns to the drive circuit 31 which operate the switching elements Q1 to Q6 of the upper and lower arms of U, V, and W-phases. In other words, the d, q/u, v, w transformation circuit 39 outputs the signals having the pulse patterns which switch the switching elements Q1 to Q6 of the inverter circuit 20 on and off on the basis of the electric angle θ detected by the position detection unit 61 by using the signals of the d-axis command voltage Vd* and the q-axis command voltage Vq*. Therefore, the d, q/u, v, w transformation circuit 39 controls the switching elements Q1 to Q6 provided in a current path of the motor 60 so as to set the values of the d-axis current and q-axis current of the motor 60 to target values on the basis of the U-phase current Iu, the V-phase current Iv, and the W-phase current Iw flowing in the motor 60.

Figure 2:
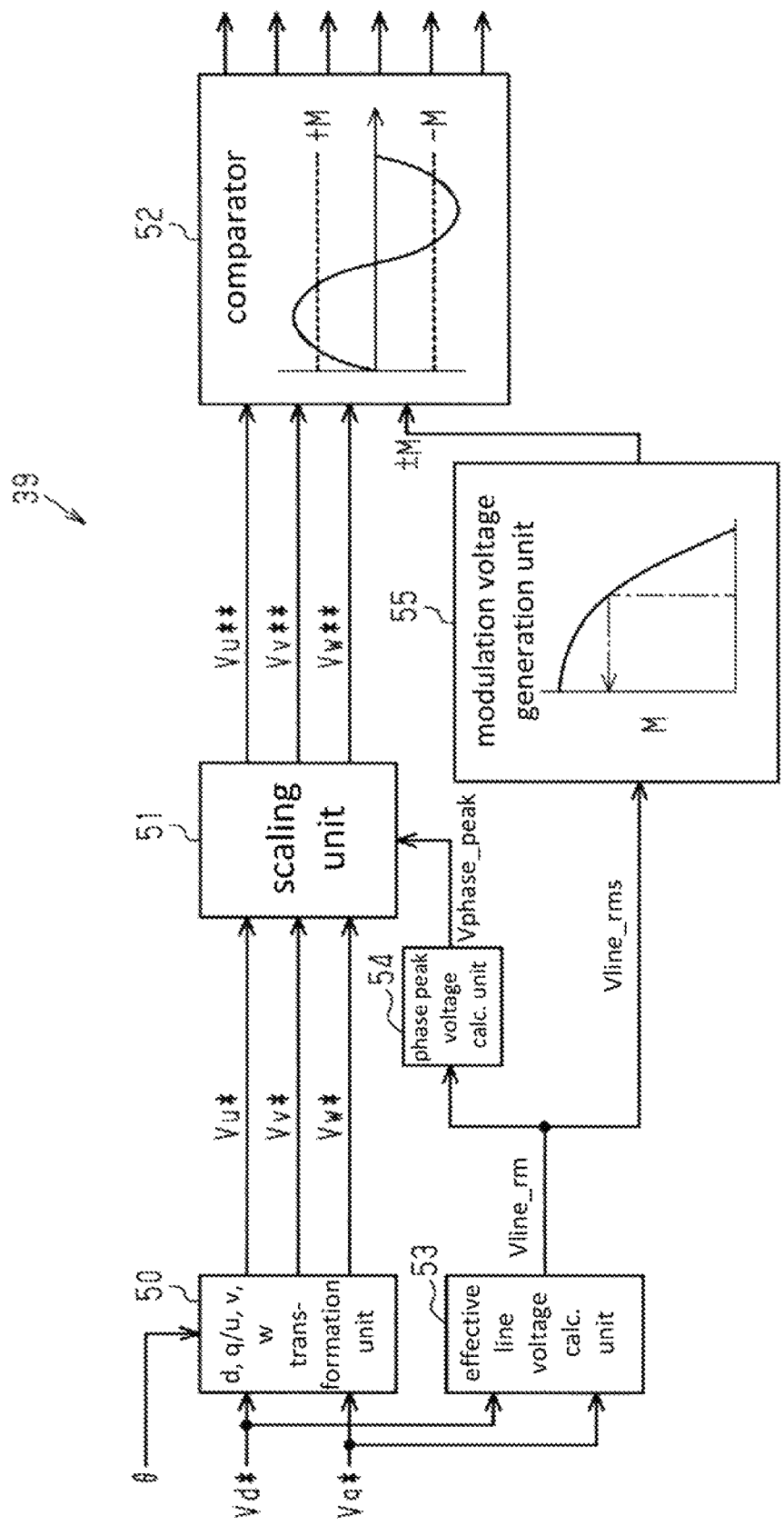
FIG. 2 is a block diagram showing a configuration of a d, q/u, v, w transformation circuit according to a first embodiment.

The d, q/u, v, w transformation circuit 39 has a configuration illustrated in FIG. 2. Referring to FIG. 2, the d, q/u, v, w transformation circuit 39 has a d, q/u, v, w transformation unit 50, a scaling unit 51, a comparator 52, an effective line voltage calculation unit 53, a phase peak voltage calculation unit 54, and a modulation voltage generation unit 55.

The d, q/u, v, w transformation unit 50 performs a coordinate transformation from the two-phase system (d, q) with the d-axis command voltage Vd* and the q-axis command voltage Vq* to three-phase system (u, v, w) with the U-phase command voltage Vu*, the V-phase command voltage Vv*, and the W-phase command voltage Vw* on the basis of the electric angle θ as the information of the angle (a position of a rotor).

The effective line voltage calculation unit 53 receives the signals of the d-axis command voltage Vd* and the q-axis command voltage Vq*, and calculates the effective line voltage Vline-rms. In detail, the effective line voltage is calculated by the following equation: Vline-rms=√(Vd*²+Vq*²)

The phase peak voltage calculation unit 54 calculates a phase peak voltage Vphase-peak of the U-phase, V-phase, and W-phase command voltages having the effective line voltage Vline-rms. In detail, the phase peak voltage Vphase-peak is calculated by the following equation: Vphase-peak=Vline-rms×√2/√3

The scaling unit 51 scales the signals of the U-phase, V-phase, and W-phase command voltages Vu*, Vv*, Vw* by the phase peak voltage Vphase-peak of the U-phase, V-phase, and W-phase command voltages Vu*, Vv*, Vw* having the effective line voltage Vline-rms in the range of −1 to +1. The scaled signals, which are referred as the signals of U-phase, V-phase, and W-phase command voltages W, Vv, Vw**, are input to the comparator 52.

Thus, the signals having waveforms (sine wave) corresponding to the signals of the U-phase, V-phase, and W-phase command voltages Vu*, Vv*, Vw* are generated on the basis of the electric angle θ, the d-axis command voltage Vd*, and the q-axis command voltage Vq* by the d, q/u, v, w transformation unit 50 and the scaling unit 51 as the signal generator.

Figure 3:
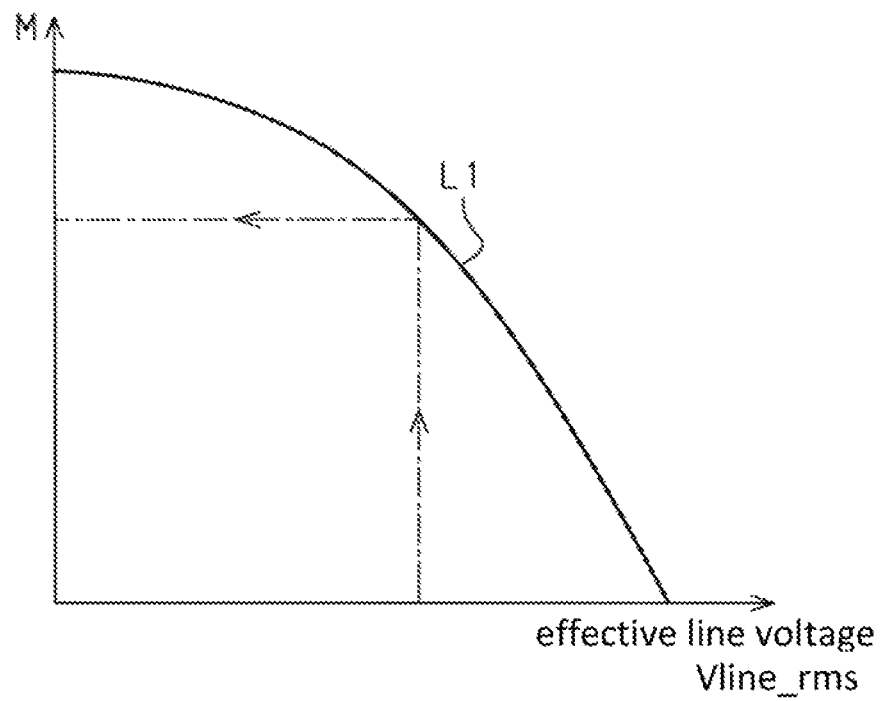
FIG. 3 is a graph showing a relationship between an effective line voltage and a modulation voltage.

The modulation voltage generation unit 55 receives the effective line voltage Vline-rms calculated by the effective line voltage calculation unit 53, and generates a modulation voltage M by using a characteristic map illustrated in FIG. 3. In FIG. 3, a horizontal axis shows the effective line voltage Vline-rms, and a vertical axis shows the modulation voltage M. A characteristic line L1 is characteristic map data which is calculated in advance. Instead of the characteristic line, table data, an approximate expression, and the like may be used. The modulation voltage M is a component that determines a pulse width of the pulse pattern. Both of a positive modulation voltage +M and a negative modulation voltage −M are input to the comparator 52. In other word, the modulation voltage generation unit 55 generates the positive modulation voltage +M in the range of 0 to 1 and the negative modulation voltage −M in the range of −1 to 0.

Figure 5:
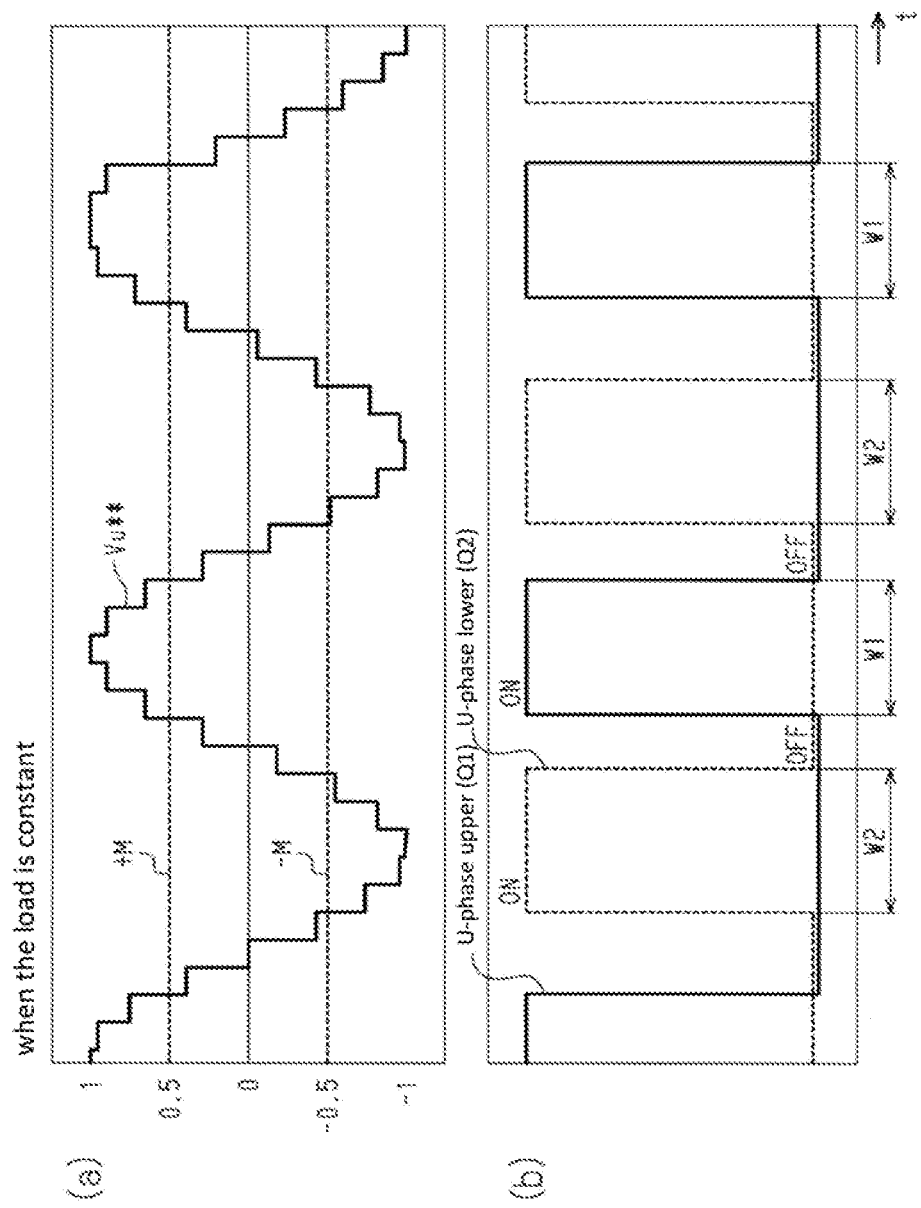
FIG. 5 at (a) and (b) illustrates figures showing waveforms when a load is constant.
Figure 6:
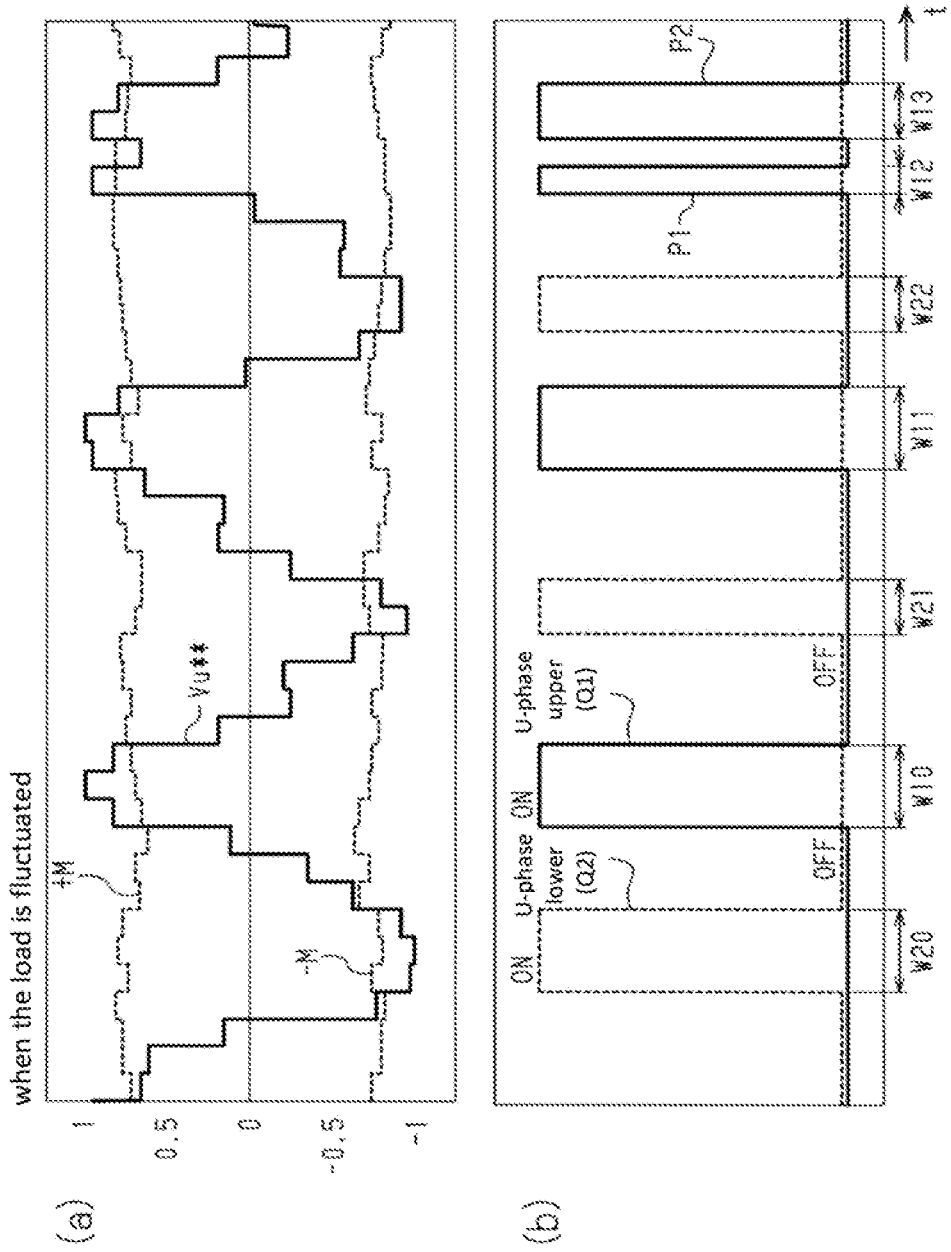
FIG. 6 at (a) and (b) illustrates figures showing waveforms when a load is fluctuated.

The modulation voltage M is generated every control period which is at most about one tenth one period of the signals of the command voltage of the U-phase, the V-phase, and the W-phase Vu, Vv, Vw** (see FIG. 5 at (a) and FIG. 6 at (b)).

Figure 4:
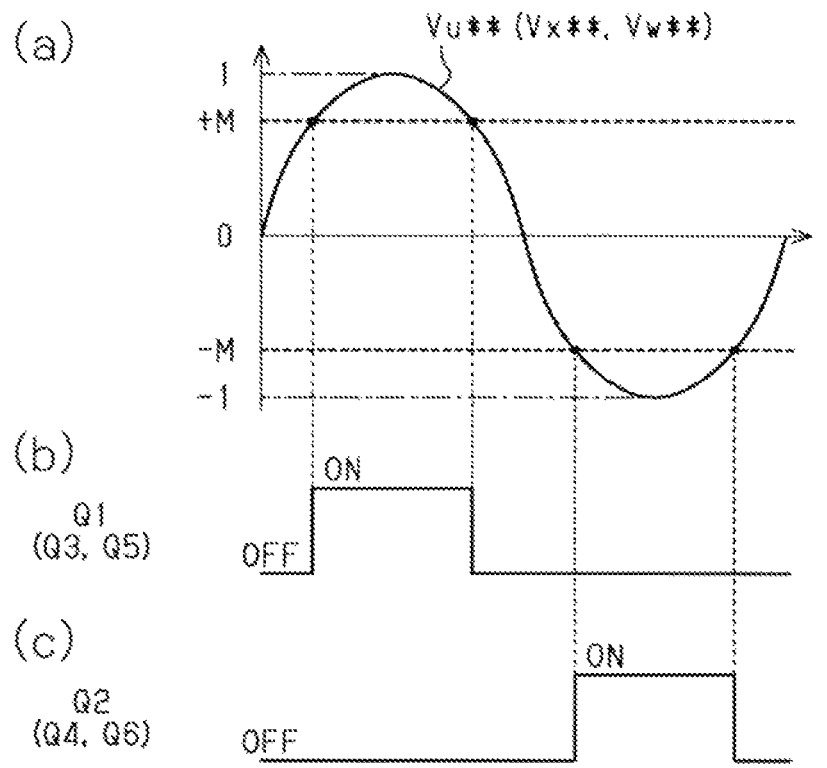
FIG. 4 at (a) illustrates a graph showing a comparative operation by a comparator, and FIG. 4 at (b) and (c) illustrates figures showing pulse patterns which operate switching elements.

The comparator 52 as the comparison unit compares the signals having waveforms (sine wave) corresponding to the signals of the U-phase, V-phase, and W-phase command voltages Vu*, Vv*, Vw* generated by the d, q/u, v, w transformation unit 50 with signals of the modulation voltage M generated by the modulation voltage generation unit 55, as illustrated in FIG. 4. Then, the comparator 52 outputs the signals having pulse patterns which operate the upper arm switching elements Q1, Q3, Q5 and the lower arm switching element Q2, Q4, Q6 in the inverter circuit 20.

In detail, the comparator 52 compares the signal of the U-phase command voltage Vu** scaled by the phase peak voltage Vphase-peak of the U-phase command voltage Vu* having the effective line voltage Vline-rms in the range of −1 to +1 with the signals of the positive modulation voltage +M in the range of 0 to 1 and the negative modulation voltage −M in the range of −1 to 0. Then, the comparator 52 outputs the signal having a pulse pattern which operates the upper arm switching element Q1 and indicates a comparison result of the magnitude of the signals of the scaled U-phase command voltage Vu and the positive modulation voltage +M in the range of 0 to +1, as illustrated in FIG. 4 at (b). The comparator 52 also outputs the signal having a pulse pattern which operates the lower arm switching element Q2 and indicates a comparison result of the magnitude of the signals of the scaled U-phase command voltage Vu and the negative modulation voltage −M in the range of −1 to 0, as illustrated in FIG. 4 at (c).

Similarly to the result in U-phase, the comparator 52 compares the signal of the V-phase command voltage Vv* scaled by the phase peak voltage Vphase-peak of the V-phase command voltage Vv* having the effective line voltage Vline-rms in the range of −1 to +1 with the signals of the positive modulation voltage +M in the range of 0 to 1 and the negative modulation voltage −M in the range of −1 to 0. Then, the comparator 52 outputs the signal having a pulse pattern which operates the upper arm switching element Q3 and indicates a comparison result of the magnitude of the signals of the scaled V-phase command voltage Vv and the positive modulation voltage +M in the range of 0 to +1. The comparator 52 also outputs the signal having a pulse pattern which operates the lower arm switching element Q4 and indicates a comparison result of the magnitude of the signals of the scaled V-phase command voltage Vv and the negative modulation voltage −M in the range of −1 to 0.

Similarly, the comparator 52 compares the signal of the W-phase command voltage Vw** scaled by the phase peak voltage Vphase-peak of the W-phase command voltage Vw* having the effective line voltage Vline-rms in the range of −1 to +1 with the signals of the positive modulation voltage +M in the range of 0 to 1 and the negative modulation voltage −M in the range of −1 to 0. Then, the comparator 52 outputs the signal having a pulse pattern which operates the upper arm switching element Q5 and indicates a comparison result of the magnitude of the signals of the scaled W-phase command voltage Vw* and the positive modulation voltage +M in the range of 0 to +1. The comparator 52 outputs a pulse pattern which operates the lower arm switching element Q6 and indicates a comparison result of the magnitude of the signals of the scaled W-phase command voltage Vw** and the negative modulation voltage −M in the range of −1 to 0.

In the comparator 52, the comparison of the signals of the command voltages Vu, Vv, Vw and the signals of the modulation voltage ±M is performed every control period which is at most about one tenth one period of the signals of the command voltages of the U-phase, the V-phase, and the W-phase Vu, Vv, Vw (see FIG. 5 at (a) and (b), and FIGS. 6 (a) and (b)).

The following will describe an operation of the inverter device 10.

In FIG. 2, inputs of a pulse generation algorithm are the signals of the electric angle θ, the d-axis command voltage Vd*, and the q-axis command voltage Vq*, and outputs of the pulse generation algorithm are the signals having the pulse patterns which operate the upper and lower arm switching elements of the U-phase, the V-phase, and the W-phase.

In FIG. 2, the d, q/u, v, w transformation unit 50 performs a coordinate transformation from the two-phase system (d, q) with the d-axis command voltage Vd* and the q-axis command voltage Vq* to the three-phase system (u, v, w) with the U-phase command voltage Vu*, the V-phase command voltage Vv*, and the W-phase command voltage Vw*. Then, the scaling unit 51 scales the signals of the U-phase, V-phase, and W-phase command voltages Vu*, Vv*, Vw* by the phase peak voltage of the U-phase, the V-phase, and the W-phase. The signals of the U-phase, V-phase, and W-phase command voltages Vu*, Vv*, Vw* are scaled in the range of −1 to +1.

On the other hand, the effective line voltage calculation unit 53 receives the signals of the d-axis command voltage Vd* and the q-axis command voltage Vq*, and calculates the effective line voltage Vline-rms. The modulation voltage generation unit 55 receives the effective line voltage Vine-rms, and generates the modulation voltage M on the basis of the data calculated in advance.

The comparator 52 compares the input signal of the U-phase command voltage Vu with the signal of the modulation voltage ±M. The pulse pattern which operates the upper arm switching element Q1 is determined by comparison of the signals of the command voltage Vu and the positive modulation voltage +M. The pulse pattern which operates the lower arm switching element Q2 is determined by comparison of the signals of the command voltage Vu** and the negative modulation voltage −M.

In the V-phase and W-phase, the signals of the V-phase command voltage and the W-phase command voltage, which are phase-shifted by ±⅔T [rad] relative to the signal of the U-phase command voltage, respectively, are compared with the signal of the modulation voltage ±M.

The following will describe a simulation result of an example in which a pulse width of the pulse pattern is changed with reference to FIG. 5 at (a) and (b), and FIG. 6 at (a) and (b).

FIG. 5 at (a) and (b) shows the case in which the load is constant. FIG. 6 at (a) and (b) shows the case in which the load is fluctuated.

The signal of the U-phase command voltage Vu** and the positive and negative modulation voltage M are illustrated in the FIG. 5 at (a) and FIG. 6 at (a). The pulse patterns which operate the U-phase upper arm switching element Q1 and the U-phase lower arm switching element Q2 are illustrated in FIG. 5 at (b) and FIG. 6 at (b).

In the FIG. 5 at (a) and FIG. 6 at (a), the signal of the U-phase command voltage Vu** in accordance with the d-axis command voltage and the q-axis command voltage is sampled every control period (calculation period), so that the signal is changed stepwise.

As illustrated in FIG. 5 at (a), when the load is constant, the signal of the U-phase command voltage Vu** is substantially a sine wave, and the signals of the modulation voltage M are also constant. Thus, a pulse width W1 of the switching element Q1 and a pulse width W2 of the switching element Q2 are substantially constant, as illustrated in FIG. 5 at (b).

As illustrated in FIG. 6 at (a), when the load is fluctuated, the signal of the U-phase command voltage Vu** is fluctuated in accordance with the load fluctuation. The signal of the modulation voltage M is also fluctuated. Thus, as illustrated in FIG. 6 at (b), the pulse pattern which operates the switching element Q1 is fluctuated, so that the pulse pattern has pulse width W10, W11, W12, W13, and the pulse pattern which operates the switching element Q2 is fluctuated, so that the pulse pattern has pulse width W20, W21, W22. This means that the pulse width is fluctuated in accordance with the load fluctuation. In respect of the pulse width W10, W11, W12, and W13, the split pulse such as the pulses P1 and P2 illustrated in FIG. 6 at (b) may be generated in some cases.

This will be described in detail as follows.

The modulation voltage M is calculated every control period, and the pulse width is controlled each time when the modulation voltage M is calculated so as to output the voltage according to the effective command voltage. In other word, the pulse width is controlled in accordance with the fluctuation of the number of rotations and the torque of a rotor. In this control, the number of pulses generated in one period of the drive current is not necessarily only one as the pulses P1 and P2 illustrated in FIG. 6 at (b).

In one example, as illustrated in FIG. 6 at (a) and (b), the case in which load is fluctuated, that is, the load is suddenly decreased will be described as follows.

A difference between the torque output from the motor and the torque of the load contributes to rotation of the motor. The rotation speed is increased as the difference between the torque output from the motor and the torque of the load is increased. Accordingly, in the present embodiment, the modulation voltage M is calculated by performing the control loop every control period, so that the increase of the number of rotations of the rotor caused by the excess torque that is provided by the decrease of the load is detected, and the smaller command voltage is output so as to decrease the number of rotations. As a result, the pulse may be OFF (on-time may be shortened or zero). Subsequently, the number of rotations is decreased when the command voltage is too small, so that the decrease of the number of rotations is detected, and the large command voltage is output so as to increase the number of rotations. As a result, the pulse may be ON again. Therefore, the number of pulses is not necessarily only one in one period of the drive current. This means that the present embodiment copes with the fluctuation of the number of rotations and the torque of the rotor.

On the other hand, the conventional system in which the one pulse is generated in one period of the drive current does not cope with the fluctuation of the number of rotations and the torque of the rotor as described above.

In a square wave drive, the switching element of each arm is switched on and off only one time in the range of the electric angle 0 to 2π. That is, the inverter device works with low switching frequency in the square wave drive. This may decrease a switching loss, and allows the inverter device to output the maximum voltage. In contrast, it is difficult to control the output voltage. In other word, a feedback control by the simple square wave drive is difficult. This means that a usable range of the inverter device is limited.

The present embodiment allows the square wave drive which minimizes the switching loss to be maintained and regulated. This means that the feedback control in which the electric angle θ, the d-axis voltage command voltage Vd*, and the q-axis voltage command voltage Vq* are returned back to the input is achieved, so that a drive range of the square wave drive is expanded.

Figure 16:
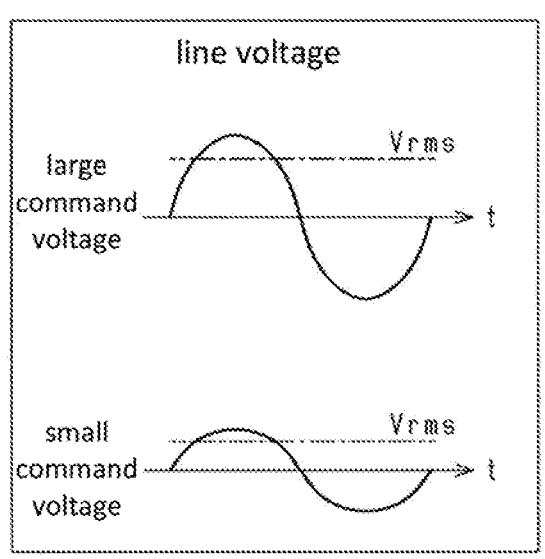
FIG. 16 at (a) illustrates a figure showing input waveforms of signals of command voltages, and FIG. 16 at (b) illustrates a figure showing the output waveforms of signals applied to line voltages in accordance with the signals of the command voltages at (a).

The pulse width illustrated in FIG. 16 at (b) is regulated according to the calculated command voltage (the effective line voltage Vrms) illustrated in FIG. 16 at (a). When the switching is performed by the controlled pulse pattern, a pulse voltage having a bipolar pulse waveform is applied to the line voltage of the motor. That is, the bipolar pulse having an effective line voltage equal to the effective line voltage calculated from the command voltage illustrated in FIG. 16 at (a) is generated. In other word, the command voltage becomes equal to the output voltage. This means that the feedback control may be used. Therefore, in the present embodiment, the command voltages Vu*, Vv*, Vw* are converted into the pulse voltages which have the same effective voltage as that of the command voltages Vu*, Vv*, Vw*, and the signal of the command voltage (sine wave) is used as a carrier signal, so that a pulse drive in which the bipolar pulse including one positive pulse and one negative pulse is generated as a rule regardless of the number of rotations of the rotor is performed, even if the period of the carrier signal is changed in accordance with the number of rotations of the rotor.

As illustrated in FIG. 18 at (a) and (b), an output pulse in the Patent Document 1 is symmetric about the electric angle of π/2 and 3/2π.

In a case where a pulse width of the output pulse is controlled by a dead time like this, the output pulse has a symmetric pulse pattern, so that the inverter device has the low follow-up capability to the load fluctuation.

In contrast with the case described above, in the present embodiment, the modulation voltage M is generated every control period according to the command voltage, thereby changing the pulse width each time when the modulation voltage M is generated as illustrated in FIG. 17. Although the pulse is sometimes generated in symmetry about the electric angle of π/2 and 3/2π, the pulse is usually generated in asymmetry about the electric angle of π/2 and 3/2π. In some cases, the pulse may be split into some pulses, that is, the number of pulses may be increased. Thus, the inverter device of the present embodiment has the high follow-up capability to the load fluctuation.

The embodiment described above provides the following advantages.

(1) The inverter device 10 includes the inverter circuit 20 that has the switching elements Q1 to Q6 connected between the negative bus and the positive bus and configuring the upper arm and the lower arm of each of the U, V W-phases, and converts the DC voltage to the AC voltage by the switching operation of the switching elements Q1 to Q6 and supplies the AC voltage to the motor. The inverter device 10 includes the d, q/u, v, w transformation unit 50 and the scaling unit 51 as the signal generator. The signal generator (the d, q/u, v, w transformation unit 50 and the scaling unit 51) generates the signals having waveforms (sine wave) corresponding to the signals of the U-phase, V-phase, and W-phase command voltages Vu*, Vv. Vw* on the basis of the electric angle θ as the information of the angle, the d-axis command voltage Vd*, and the q-axis command voltage Vq*. The inverter device 10 includes the effective line voltage calculation unit 53 as the first calculation unit that receives the signals of the d-axis command voltage Vd* and the q-axis command voltage Vq*, and calculates the effective line voltage Vline-rms. The inverter device 10 includes the modulation voltage generation unit 55 as the second calculation unit that receives the effective line voltage Vine-rms calculated by the effective line voltage calculation unit 53, and generates the modulation voltage M every control period. The inverter device 10 includes the comparator 52 as the comparison unit that compares the signals having waveforms (sine wave) corresponding to the signals of the U-phase, V-phase, and W-phase command voltages Vu*, Vv, Vw* generated by the d, q/u, v, w transformation unit 50 and the scaling unit 51 with the signals of the modulation voltage M generated by the modulation voltage generation unit 55 every control period. The comparator 52 as the comparison unit outputs the signals having pulse patterns which operate upper arm switching elements Q1, Q3, Q5 and the lower arm switching elements Q2, Q4, Q6 in the inverter circuit 20.

Accordingly, the modulation voltage M is generated by the effective line voltage Vline-rms calculated from the d-axis command voltage Vd* and the q-axis command voltage Vq* every control period, and compared with the signals of the command voltages Vu*, Vv*, Vw* every control period. The inverter device 10 has a high follow-up capability to the load fluctuation due to this configuration. In other word, the inverter device 10 has the high follow-up capability to the load fluctuation because the modulation voltage M is generated every control period according to the d-axis command voltage Vd* and the q-axis command voltage Vq*.

(2) The signal generator (50, 51) has the d, q/u, v, w transformation unit 50 and the scaling unit 51. The d, q/u, v, w transformation unit 50 performs a coordinate transformation from the two-phase system (d, q) with the d-axis command voltage Vd* and the q-axis command voltage Vq* to three-phase system (u, v, w) with the U-phase, V-phase, W-phase command voltage Vu*, Vv*, Vw* on the basis of the electric angle θ as the information of the angle. The scaling unit 51 scales the signals of the U-phase, V-phase, and W-phase command voltages Vu*, Vv*, Vw* by the phase peak voltage Vphase-peak of the U-phase, V-phase, and W-phase command voltages Vu*, Vv*, Vw* having the effective line voltage Vline-rms in the range of −1 to +1. The modulation voltage generation unit 55 as the second calculation unit generates the signals of the positive modulation voltage +M in the range of 0 to 1 and the negative modulation voltage −M in the range of −1 to 0. The comparator 52 as the comparison unit compares the signals of the U-phase, V-phase, and W-phase command voltage Vu, Vv, Vw** scaled by the phase peak voltage Vphase-peak of the U-phase, V-phase, W-phase command voltage W*, Vv*, Vw* having the effective line voltage Vline-rms in the range of −1 to +1 with the signals of the positive modulation voltage +M in the range of 0 to 1 and the negative modulation voltage −M in the range of −1 to 0. Then, the comparator 52 outputs the signals having pulse patterns which operate the upper arm switching elements Q1, Q3, Q5 and indicate a comparison result of the magnitude of the signals of the scaled U-phase, V-phase, and W-phase command voltage Vu, Vv, VW and the positive modulation voltage +M in the range of 0 to +1. In addition, the comparator 52 outputs the signals having pulse patterns which operate the lower arm switching elements Q2, Q4, Q6 and indicate a comparison result of the magnitude of the signals of the scaled U-phase, V-phase, and W-phase command voltage Vu, Vv, Vw and the negative modulation voltage −M in the range of −1 to 0. This means that the inverter device 10 is a practical device.

Second Embodiment

The following will describe a second embodiment while focusing on a difference between the first embodiment and the second embodiment. Instead of FIG. 2, the d, q/u, v, w transformation circuit 39 has a configuration illustrated in FIG. 7.

Figure 7:
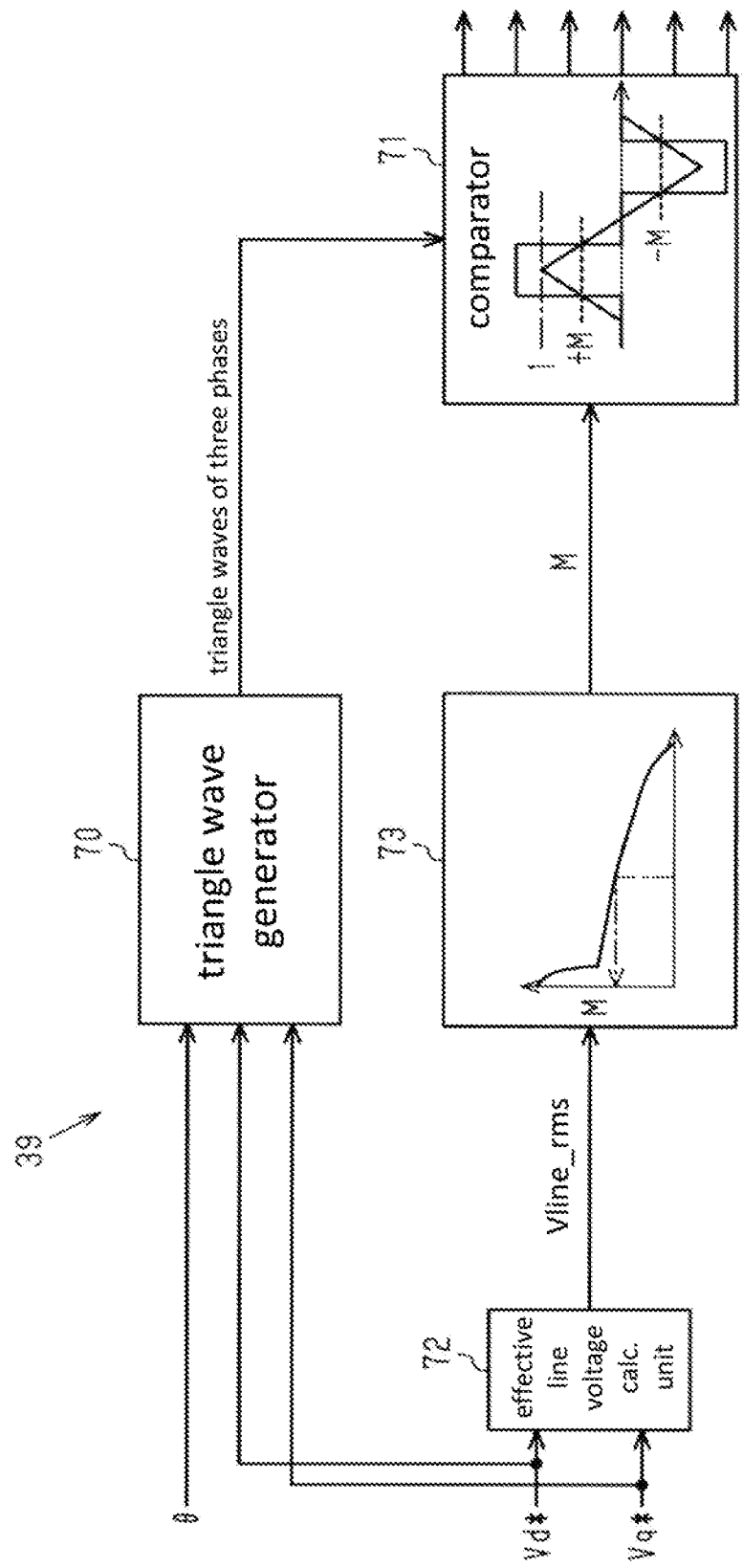
FIG. 7 is a block diagram showing a configuration of the d, q/u, v, w transformation circuit according to a second embodiment.

In FIG. 7, inputs of a pulse generation algorithm are the signals of the electric angle θ as the information of the angle (the position of the rotor), the d-axis command voltage Vd*, and the q-axis command voltage Vq*, and outputs of the pulse generation algorithm are the signals having pulse patterns which operate the upper and lower arm switching elements of the U-phase, the V-phase, and the W-phase.

The d, q/u, v w transformation circuit 39 of the present embodiment includes a triangle wave generator 70, a comparator 71, an effective line voltage calculation unit 72, and a modulation voltage generation unit 73. The triangle wave generator 70 generates signals of the U-phase, the V-phase, and the W-phase each having a waveform of a triangle wave on the basis of the electric angle θ as an information of an angle, the d-axis command voltage Vd*, and the q-axis command voltage Vq*. A phase of the triangle wave is obtained by the phase difference from the electric angle θ calculated from the electric angle (θ) and a voltage phase angle δ (from the command voltage Vd*, Vq*). An amplitude of the triangle wave is 1. A frequency of the triangle wave is changed in accordance with the number of rotations of the rotor (a ratio of a temporal change in the electric angle θ). The signal of the triangle wave for one cycle is generated in one period of the drive current. The signal of the triangle wave is input to the comparator 71.

Figure 8:
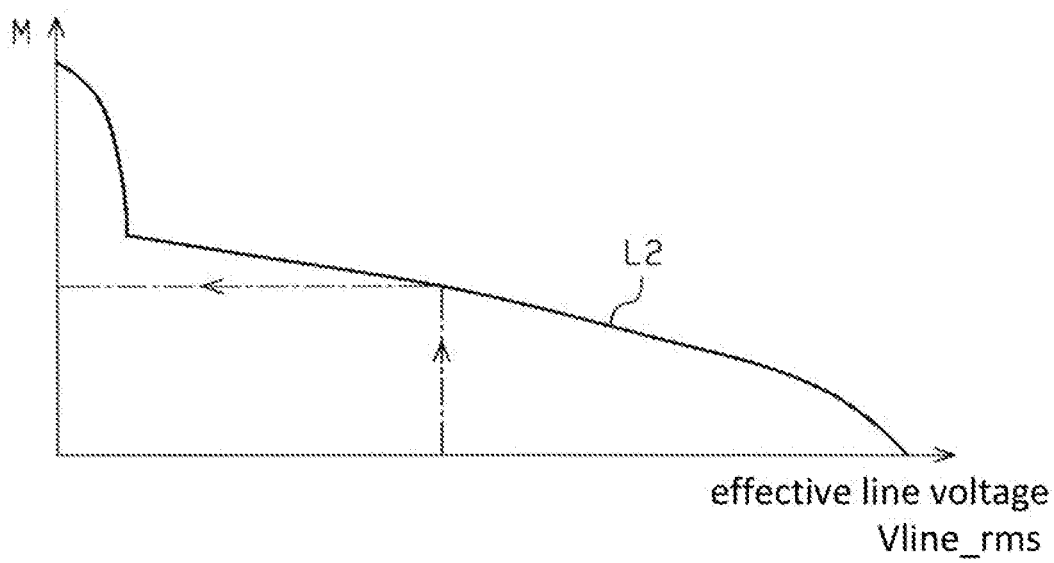
FIG. 8 is a graph showing a relationship between the effective line voltage and the modulation voltage.

The effective line voltage calculation unit 72 receives the signals of the d-axis command voltage Vd* and the q-axis command voltage Vq*, and calculates the effective line voltage Vline-rms of the motor. In detail, the effective line voltage is calculated by the following equation: Vline-rms= $(Vd^{*2}+Vq^{*2})$ The modulation voltage generation unit 73 receives the effective line voltage, and generates the modulation voltage M by using a characteristic map illustrated in FIG. 8, that is, data in which the effective line voltage is calculated in advance. In FIG. 8, a horizontal axis shows the effective line voltage Vline-rms, and a vertical axis shows the modulation voltage M. A characteristic line L2 is characteristic map data which is calculated in advance. Instead of the characteristic line, table data, an approximate expression, and the like may be used. The modulation voltage M is a component that determines a pulse width of the pulse pattern. Referring to the FIG. 9 at (a), both of the positive modulation voltage +M and the negative modulation voltage −M are input to the comparator 71.

Figure 9:
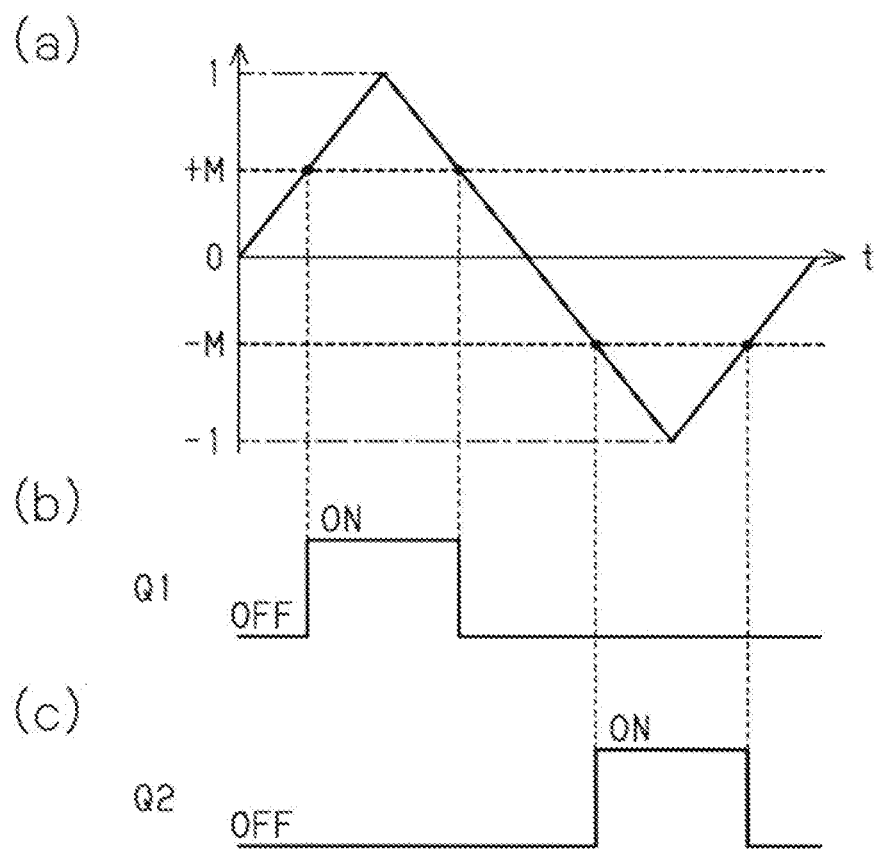
FIG. 9 at (a) illustrates a graph showing a comparative operation by the comparator, and FIG. 9 at (b) and (c) illustrates figures showing pulse patterns which operate the switching elements.

As illustrated in FIG. 9 at (a), the comparator 71 compares the input signal of the triangle wave with the signal of the modulation voltage ±M. As illustrated in FIG. 9 at (b), the comparator 71 compares the signal of the triangle wave of the U-phase with the signal of the positive modulation voltage +M, and determines the pulse pattern of the upper arm switching element Q1 of the U-phase. In addition, as illustrated in FIG. 9 at (c), the comparator 71 compares the signal of the triangle wave of the U-phase with the signal of the negative modulation voltage −M, and determines the pulse pattern of the lower arm switching element Q2 of the U-phase. Similarly to the pulse pattern of the U-phase, the comparator 71 compares the input signal of the triangle wave of the V-phase with the signal of the modulation voltage M. The comparator 71 compares the signal of the triangle wave of the V-phase with the signal of the positive modulation voltage +M, and determines the pulse pattern of the upper arm switching element Q3 of the V-phase. The comparator 71 compares the signal of the triangle wave of the V-phase with the signal of the negative modulation voltage −M, and determines the pulse pattern of the lower arm switching element Q4 of the V-phase. Similarly, the comparator 71 compares the input signal of the triangle wave of the W-phase with the signal of the modulation voltage ±M. The comparator 71 compares the signal of the triangle wave of the W-phase with the signal of the positive modulation voltage +M, and determines the pulse pattern of the upper arm switching element Q5 of the W-phase. The comparator 71 compares the signal of the triangle wave of the W-phase with the signal of the negative modulation voltage −M, and determines the pulse pattern of the lower arm switching element Q6 of the W-phase. Thus, each signal of the triangle waves of the U-phase, the V-phase, and the W-phase is compared with the signal of the modulation voltage ±M because the signals of the triangle waves of the V-phase and the W-phase are phase-shifted by ±⅔π [rad] relative to the signal of the triangle wave of the U-phase, respectively.

Thus, the inverter device 10 includes the inverter circuit 20, the triangle wave generator 70, the effective line voltage calculation unit 72, the modulation voltage generation unit 73, and the comparator 71. The triangle wave generator 70 as the signal generator generates the signals having waveforms (triangle wave) corresponding to the signals of the U-phase, V-phase, and W-phase command voltages on the basis of the electric angle θ as the information of the angle, the d-axis command voltage Vd*, and the q-axis command voltage Vq*. The effective line voltage calculation unit 72 as the first calculation unit receives the signals of the d-axis command voltage Vd* and the q-axis command voltage Vq*, and calculates the effective line voltage Vline-rms of the motor. The modulation voltage generation unit 73 as the second calculation unit receives the effective line voltage Vline-rms calculated by the effective line voltage calculation unit 72, and generates the modulation voltage M every control period. The comparator 71 as the comparison unit compares the signals generated by the triangle wave generator 70 and each having a waveform (triangle wave) corresponding to the signals of the U-phase, V-phase, and W-phase command voltages with the signals of the modulation voltage M generated by the modulation voltage generation unit 73 every control period. The comparator 71 outputs the signals having pulse patterns which operate the upper arm switching elements Q1, Q3, Q5 and the lower arm switching elements Q2, Q4, Q6 in the inverter circuit 20.

In detail, the triangle wave generator 70 as the signal generator generates the signals of the U-phase, the V-phase, and the W-phase each having a waveform of a triangle wave the amplitude of which is 1 on the basis of the electric angle θ as the information of the angle, the d-axis command voltage Vd*, and the q-axis command voltage Vq*. The modulation voltage generation unit 73 as the second calculation unit generates the signals of the positive modulation voltage +M in the range of 0 to 1 and the negative modulation voltage −M in the range of −1 to 0. The comparator 71 as the comparison unit compares the signals of the generated triangle wave with the signals of the positive modulation voltage +M in the range of 0 to 1 and the negative modulation voltage −M in the range of −1 to 0. The comparator 71 outputs the signals having pulse patterns which operate the upper arm switching elements Q1, Q3, Q5 and indicate a comparison result of the magnitude of the signals of the generated triangle wave and the positive modulation voltage +M in the range of 0 to +1. The comparator 71 outputs the signals of pulse patterns which operate the lower arm switching elements Q2, Q4, Q6 and indicate a comparison result of the magnitude of the signals of the generated triangle wave and the negative modulation voltage −M in the range of −1 to 0.

Third Embodiment

The following will describe a third embodiment while focusing on a difference between the second embodiment and the third embodiment.

Figure 10:
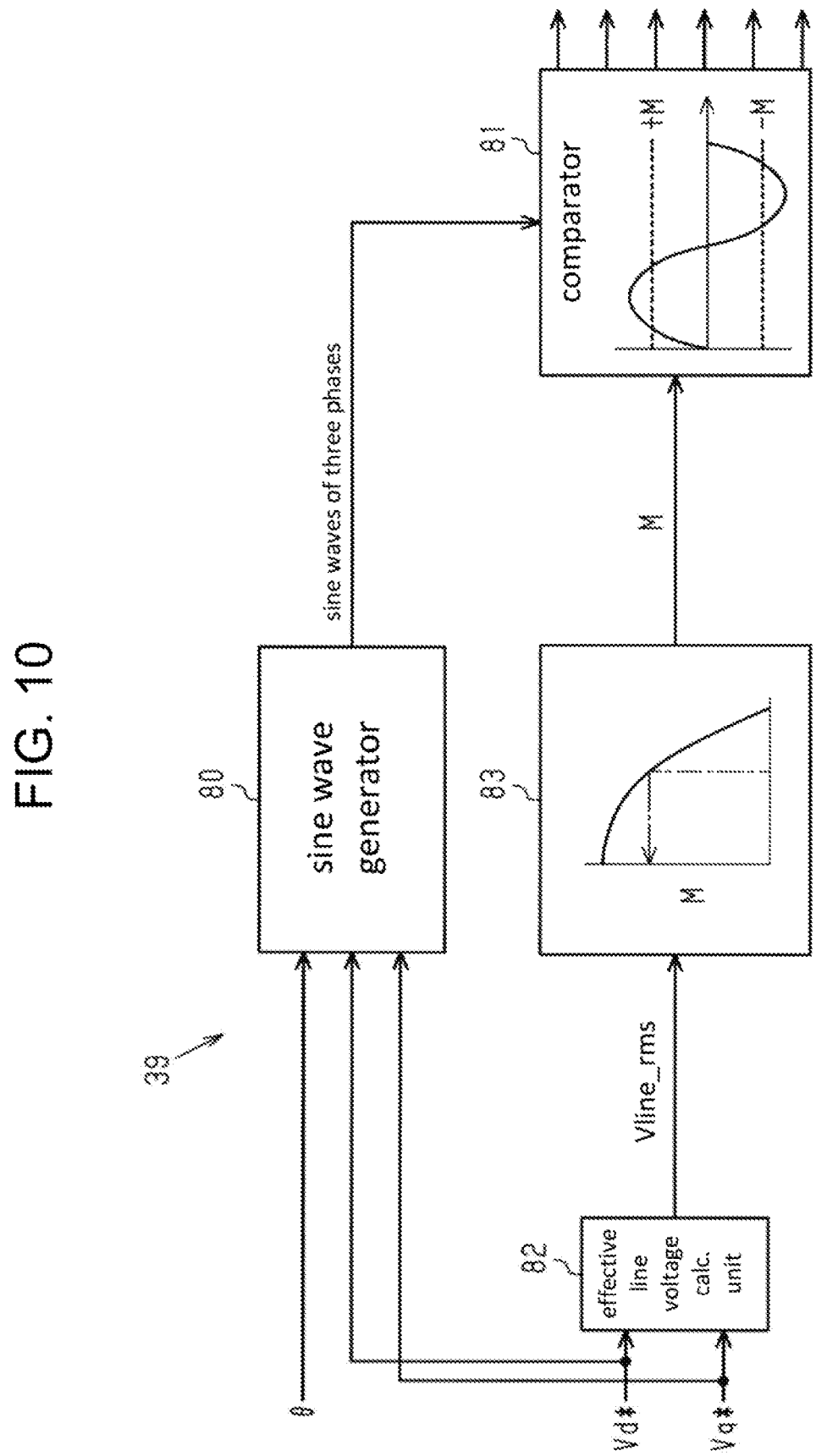
FIG. 10 is a block diagram showing a configuration of the d, q/u, v, w transformation circuit according to a third embodiment.

Instead of FIG. 7, the d, q/u, v, w transformation circuit 39 has a configuration illustrated in FIG. 10.

In FIG. 10, inputs of a pulse generation algorithm are the signals of the electric angle θ as the information of the angle (the position of the rotor), the d-axis command voltage Vd*, and the q-axis command voltage Vq*, and outputs of the pulse generation algorithm are the signals having pulse patterns which operate the upper and lower switching elements Q1 to Q6 of the U-phase, the V-phase, and the W-phase.

The d, q/u, v, w transformation circuit 39 of the present embodiment includes a sine wave generator 80, a comparator 81, an effective line voltage calculation unit 82, and a modulation voltage generation unit 83. The sine wave generator 80 generates signals of the U-phase, the V-phase, and the W-phase each having a waveform of a sine wave on the basis of the d-axis command voltage Vd*, the q-axis command voltage Vq*, and the electric angle θ as the information of the angle. A phase of the sine wave is obtained by the phase difference from the electric angle θ calculated from the electric angle (θ) and the voltage phase angle δ (from the command voltage Vd*, Vq*). An amplitude of the sine wave is 1. A frequency of the sine wave is changed in accordance with the number of rotations of the rotor (a ratio of a temporal change in the electric angle θ). The sine wave for one cycle is generated in one period of the drive current. The signal of the sine wave is input to the comparator 81.

The effective line voltage calculation unit 82 receives the signals of the d-axis command voltage Vd* and the q-axis command voltage Vq*, and calculates the effective line voltage Vline-rms of the motor. In detail, the effective line voltage is calculated by the following equation: Vline-rms=√(Vd*²+Vq*²)

The modulation voltage generation unit 83 receives the effective line voltage, and generates the modulation voltage M by using the characteristic map illustrated in FIG. 3, that is, data in which the effective line voltage is calculated in advance. In FIG. 3, a horizontal axis shows the effective line voltage Vline-rms, and a vertical axis shows the modulation voltage M. The characteristic line L1 is characteristic map data which is calculated in advance. Instead of the characteristic fine, table data, an approximate expression, and the like may be used. The modulation voltage is a component that determines a pulse width of the pulse pattern. Both of the positive modulation voltage +M and the negative modulation voltage −M are input to the comparator 81.

The comparator 81 compares the input signal of the sine wave with the signal of the modulation voltage ±M. The comparator 81 compares the signal of the sine wave of the U-phase with the signal of the positive modulation voltage +M, and determines the pulse pattern of the upper arm switching element Q1 of the U-phase. In addition, the comparator 81 compares the signal of the sine wave of the U-phase with the signal of the negative modulation voltage −M, and determines the pulse pattern of the lower arm switching element Q2 of the U-phase. Similarly to the pulse pattern of the U-phase, the comparator 81 compares the input signal of the sine wave of the V-phase with the signal of the positive and negative modulation voltage ±M. The comparator 81 compares the signal of the sine wave of the V-phase with the signal of the positive modulation voltage +M, and determines the pulse pattern of the upper arm switching element Q3 of the V-phase. The comparator 81 compares the signal of the sine wave of the V-phase with the signal of the negative modulation voltage −M, and determines the pulse pattern of the lower arm switching element Q4 of the V-phase. Similarly, the comparator 81 compares the input signal of the sine wave of the W-phase with the signal of the modulation voltage M. The comparator 81 compares the signal of the sine wave of the W-phase with the signal of the positive modulation voltage +M, and determines the pulse pattern of the upper arm switching element Q5 of the W-phase. The comparator 81 compares the signal of the sine wave of the W-phase with the signal of the negative modulation voltage −M, and determines the pulse pattern of the lower arm switching element Q6 of the W-phase. Thus, each signal of the sine waves of the U-phase, the V-phase, and the W-phase is compared with the signal of the modulation voltage ±M because the signals of the sine waves of the V-phase and the W-phase are phase-shifted by ±⅔π [rad] relative to the signal of the sine wave of the U-phase, respectively.

The sine wave generator 80 as the signal generator generates the signals of the U-phase, the V-phase, and the W-phase each having a waveform of a sine wave the amplitude of which is 1 on the basis of the electric angle θ as the information of the angle, the d-axis command voltage Vd*, and the q-axis command voltage Vq*. The modulation voltage generation unit 83 as the second calculation unit generates the signals of the positive modulation voltage +M in the range of 0 to 1 and the negative modulation voltage −M in the range of −1 to 0. The comparator 81 as the comparison unit compares the signals of the generated sine wave with the signals of the positive modulation voltage +M in the range of 0 to 1 and the negative modulation voltage −M in the range of −1 to 0. The comparator 81 outputs signals having pulse patterns which operate the upper arm switching elements Q1, Q3, Q5 and indicate a comparison result of the magnitude of the signals of the generated sine wave and the positive modulation voltage +M in the range of 0 to +1. The comparator 81 outputs signals having pulse patterns which operate the lower arm switching elements Q2, Q4, Q6 and indicate a comparison result of the magnitude of the signals of the generated sine wave and the negative modulation voltage −M in the range of −1 to 0.

In the present embodiment, the signal of the sine wave input to the comparator 81 is sampled by a clock regardless of the control period (calculation period), so that the signal of more smooth sine wave is output in comparison with that of the first embodiment.

Fourth Embodiment

The following will describe a fourth embodiment while focusing on a difference between the second embodiment and the fourth embodiment.

Figure 11:
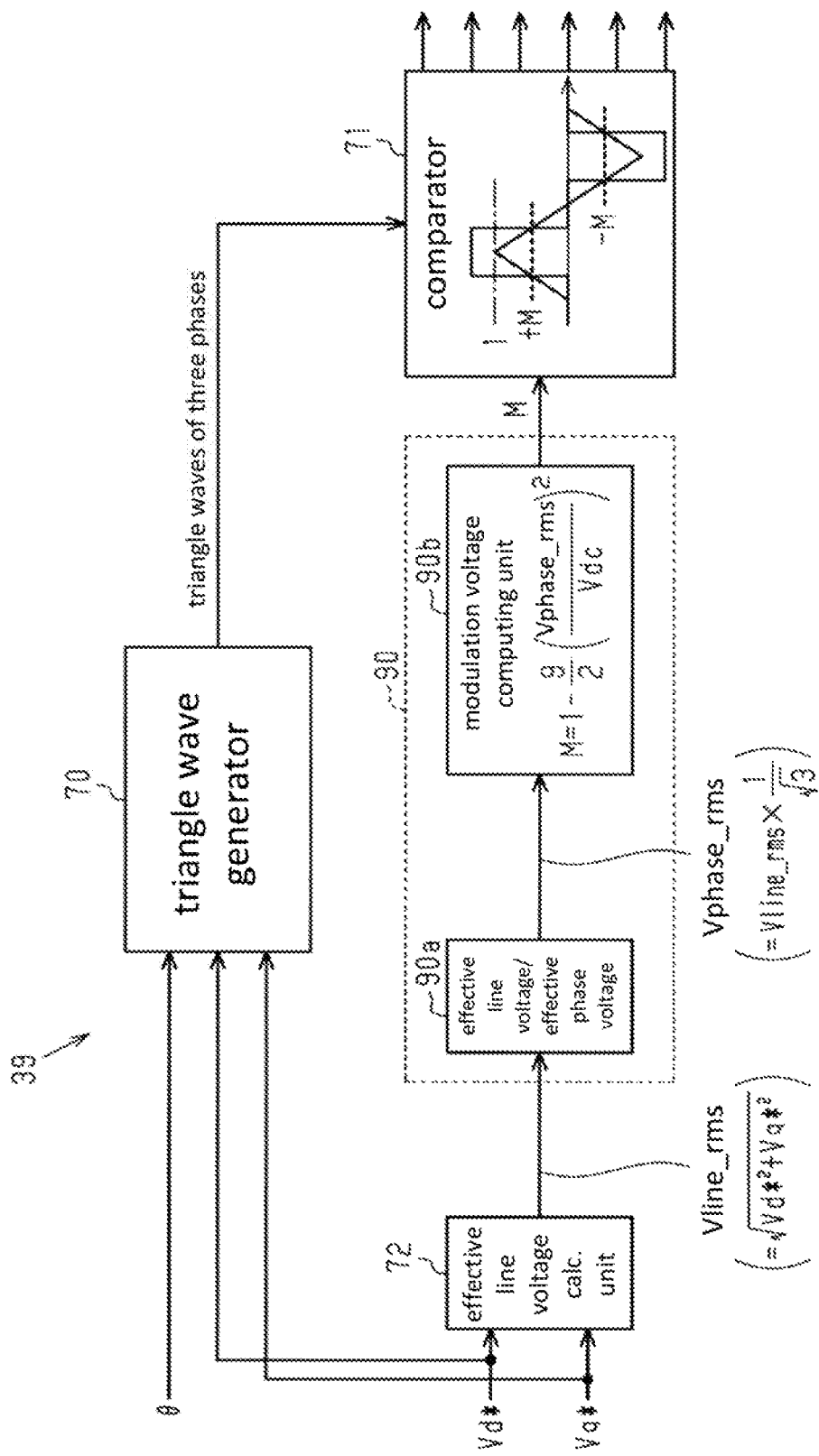
FIG. 11 is a block diagram showing a configuration of the d, q/u, v, w transformation circuit according to a fourth embodiment.

Instead of FIG. 7, the d, q/u, v, w transformation circuit 39 has a configuration illustrated in FIG. 11.

The modulation voltage generation unit 73 illustrated in FIG. 7 uses the map illustrated in FIG. 8. The characteristic line L2 in FIG. 8 is data calculated in advance. Characteristic map data, table data, an approximate expression, and the like are used as the data.

As illustrated in FIG. 11, the d, q/u, v, w transformation circuit 39 of the present embodiment includes the triangle wave generator 70, the comparator 71, the effective line voltage calculation unit 72, and a modulation voltage generation unit 90. The modulation voltage generation unit 90 has an effective line voltage/effective phase voltage calculation unit 90a and a modulation voltage computing unit 90b.

The triangle wave generator 70 generates signals of the U-phase, the V-phase, and the W-phase each having a waveform of a triangle wave on the basis of the electric angle θ as an information of an angle, the d-axis command voltage Vd*, and the q-axis command voltage Vq*. A phase of the triangle wave is obtained by the phase difference from the electric angle θ calculated from the electric angle (θ) and the voltage phase angle θ (from the command voltage Vd*, Vq*). An amplitude of the triangle wave is 1. A frequency of the triangle wave is changed in accordance with the number of rotations of the rotor (a ratio of a temporal change in the electric angle θ). The signal of the triangle wave for one cycle is generated in one period of the drive current. The signal of the triangle wave is input to the comparator 71.

The effective line voltage calculation unit 72 receives the signals of the d-axis command voltage Vd* and the q-axis command voltage Vq*, and calculates the effective line voltage Vline-rms of the motor. In detail, the effective line voltage is calculated by the following equation: Vline-rms=√(Vd*²+Vq*²)

The effective line voltage/effective phase voltage calculation unit 90a calculates the effective phase voltage Vphase-rms from the effective line voltage Vline-rms by the following equation (1).

[Equation 1]

$$V_{phase\_rms} = V_{line\_rms} \times \frac{1}{\sqrt{3}} \quad (1)$$

The modulation voltage computing unit 90b computes the modulation voltage M from the effective phase voltage Vphase-rms by the following equation (2).

[Equation 2]

$$M = 1 - \frac{9}{2}\left(\frac{V_{phase\_rms}}{V_{dc}}\right)^2 \quad (2)$$

It is noted that a terminal voltage of the battery B (DC voltage) illustrated in FIG. 1, which is referred as Vdc, is detected by a voltage sensor 100 as illustrated by an imaginary line in FIG. 1. The detection result of the terminal voltage of the battery B (DC voltage) is input to the d, q/u, v, w transformation circuit 39.

The equation (2) will be described in detail as follows.

As illustrated in FIG. 12, when a duty cycle of the signal of the phase voltage is 100% in the range of the electric angle 0 to π, the effective phase voltage is obtained as the following equation (3) (since the upper limit is 0 at M=0).

[Equation 3]

$$V_{phase\_rms} = \frac{V_{dc}}{2} \times \sqrt{(1-M)} \quad (3)$$

Here, when the upper limit of the effective line voltage Vline-rms (=√(⅔)·Vdc) is taken into consideration from the relationship of three phases, a coefficient in the equation (3) is replaced with a coefficient of the following equation (4).

[Equation 4]

$$V_{phase\_rms} = \frac{\sqrt{2} \times V_{dc}}{3} \times \sqrt{(1-M)} \quad (4)$$

The equation (4) is transformed into the equation (2).

The following will describe the coefficient of the phase voltage.

In a case considered here, M is set to 0.

As illustrated in FIG. 13 at (a), the signal of the U-phase voltage is in either state of an on-state or an off-state. The signals of the V-phase voltage and W-phase voltage are phase-shifted by ±120 degrees relative to the signal of the U-phase voltage, respectively. The effective phase voltage Vphase-rms is half of the DC voltage Vdc (Vdc/2).

In this case, the line voltage Vine is given as follows (see FIG. 13 at (b)).

The effective line voltage Vline-rms is Vdc·√(⅔). The effective phase voltage Vphase-rms is obtained by multiplying a conversion coefficient 1/{√3} by the effective line voltage Vline-rms: Vphase-rms=1/{√3}·Vline-rms=√(2)/3·Vdc When only the phase voltage is considered, the output range of the phase voltage is between 0 to Vdc/2. However, when the effective phase voltage Vphase-rms is calculated from the effective line voltage Vline-rms in the present embodiment, the maximum value of the effective phase voltage Vphase-rms is determined to be √(2)/3·Vdc depending on the effective line voltage Vline-rms. In other word, the equation (2), which indicates the relationship between the modulation voltage M and the effective phase voltage Vphase-rms, is used so as to output the signal of the modulation voltage M=0 when the effective phase voltage Vphase-rms obtained in order from the command voltage is √(2)/3·Vdc.

The modulation voltage M obtained by the Equation (2) is a component that determines a pulse width. Both of the positive modulation voltage +M and the negative modulation voltage −M are input to the comparator 71.

The comparator 71 compares the input signal of the triangle wave with the signal of the modulation voltage ±M. Then, the comparator 71 compares the signal of the triangle wave of the U-phase with the signal of the positive modulation voltage +M, and determines the pulse pattern of the upper arm switching element Q1 of the U-phase. In addition, the comparator 71 compares the signal of the triangle wave of the U-phase with the signal of the negative modulation voltage −M, and determines the pulse pattern of the lower arm switching element Q2 of the U-phase. Similarly to the pulse pattern of the U-phase, the comparator 71 compares the input signal of the triangle wave of the V-phase with the signal of the modulation voltage ±M. The comparator 71 compares the signal of the triangle wave of the V-phase with the signal of the positive modulation voltage +M, and determines the pulse pattern of the upper arm switching element Q3 of the V-phase. The comparator 71 compares the signal of the triangle wave of the V-phase with the signal of the negative modulation voltage −M. and determines the pulse pattern of the lower arm switching element Q4 of the V-phase. Similarly, the comparator 71 compares the input signal of the triangle wave of the W-phase with the signal of the modulation voltage M. The comparator 71 compares the signal of the triangle wave of the W-phase with the signal of the positive modulation voltage +M, and determines the pulse pattern of the upper arm switching element Q5 of the W-phase. The comparator 71 compares the signal of the triangle wave of the W-phase with the signal of the negative modulation voltage −M, and determines the pulse pattern of the lower arm switching element Q6 of the W-phase. Thus, each signal of the triangle waves of the U-phase, the V-phase, and the W-phase is compared with the signal of the modulation voltage M because the signals of the triangle waves of the V-phase and the W-phase are phase-shifted by ±⅔π [rad] relative to the signal of the triangle wave of the U-phase, respectively.

In the present embodiment, the modulation voltage generation unit 90 as the second calculation unit includes the effective line voltage/effective phase voltage calculation unit 90a that calculates the effective phase voltage Vphase-rms from the effective line voltage Vline-rms, and the modulation voltage computing unit 90b that computes the modulation voltage M from the effective phase voltage Vphase-rms calculated by the effective line voltage/effective phase voltage calculation unit 90a and the DC voltage Vdc by using the mathematical expression.

Thus, the modulation voltage M is calculated by the computing operation, so that a data storage capacity of table data, characteristic map data, and an approximate expression, that is, a memory capacity may be reduced. In addition, computational load may be reduced. For example, although an interpolation processing is required when the characteristic map is used to obtain the modulation voltage M, the computational load may be reduced by using the mathematical expression.

Fifth Embodiment

The following will describe a fifth embodiment while focusing on a difference between the third and fourth embodiments and the fifth embodiment.

Figure 14:
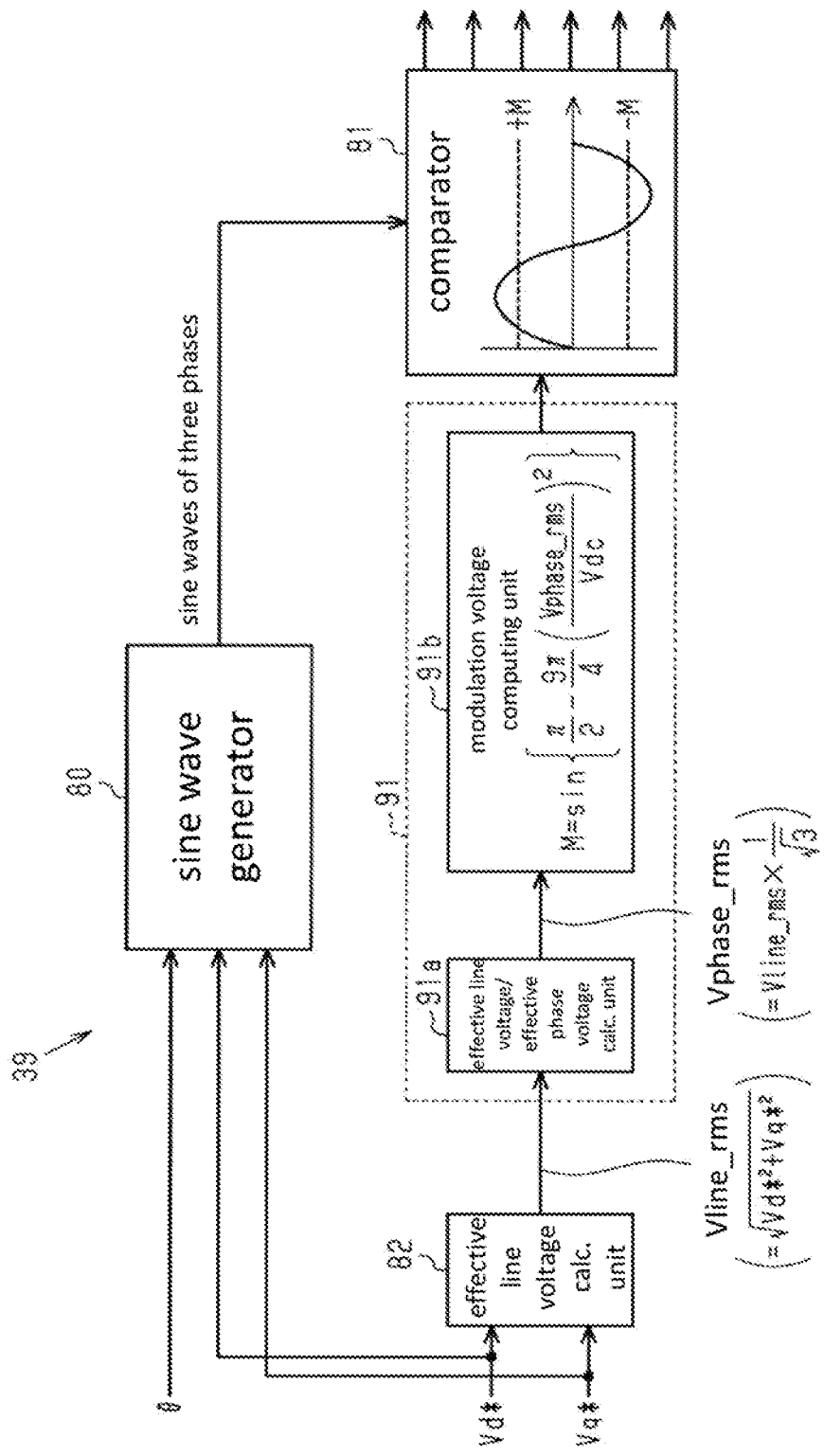
FIG. 14 is a block diagram showing a configuration of the d, q/u, v, w transformation circuit according to a fifth embodiment.

Instead of FIG. 10, the d, q/u, v, w transformation circuit 39 has a configuration illustrated in FIG. 14.

The modulation voltage generation unit 55 illustrated in FIG. 2 uses the characteristic map illustrated in FIG. 3. The characteristic line L1 in FIG. 3 is data calculated in advance. Characteristic map data, table data, an approximate expression, and the like may be used as the data.

In the present embodiment, the modulation voltage generation unit 55 as the second calculation unit in FIG. 2 is replaced with a modulation voltage generation unit 91 illustrated in FIG. 14. The modulation voltage generation unit 91 includes an effective line voltage/effective phase voltage calculation unit 91a and a modulation voltage computing unit 91b.

The effective line voltage/effective phase voltage calculation unit 91a calculates the effective phase voltage Vphase-rms from the effective line voltage Vline-rms by the above-described equation (1).

The modulation voltage computing unit 91b computes the modulation voltage M from the effective phase voltage Vphase-rms by the following equation (5).

[Equation 5]

$$M = \sin\left\{\frac{\pi}{2} - \frac{9\pi}{4}\left(\frac{V_{phase\_rms}}{V_{dc}}\right)^2\right\} \quad (5)$$

It is noted that the terminal voltage of the battery B (DC voltage) illustrated in FIG. 1, which is referred as Vdc, is detected by a voltage sensor 100. The detection result of the terminal voltage of the battery B (DC voltage) is input to the d, q/u, v, w transformation circuit 39.

The equation (5) will be described in detail as follows.

Figure 15:
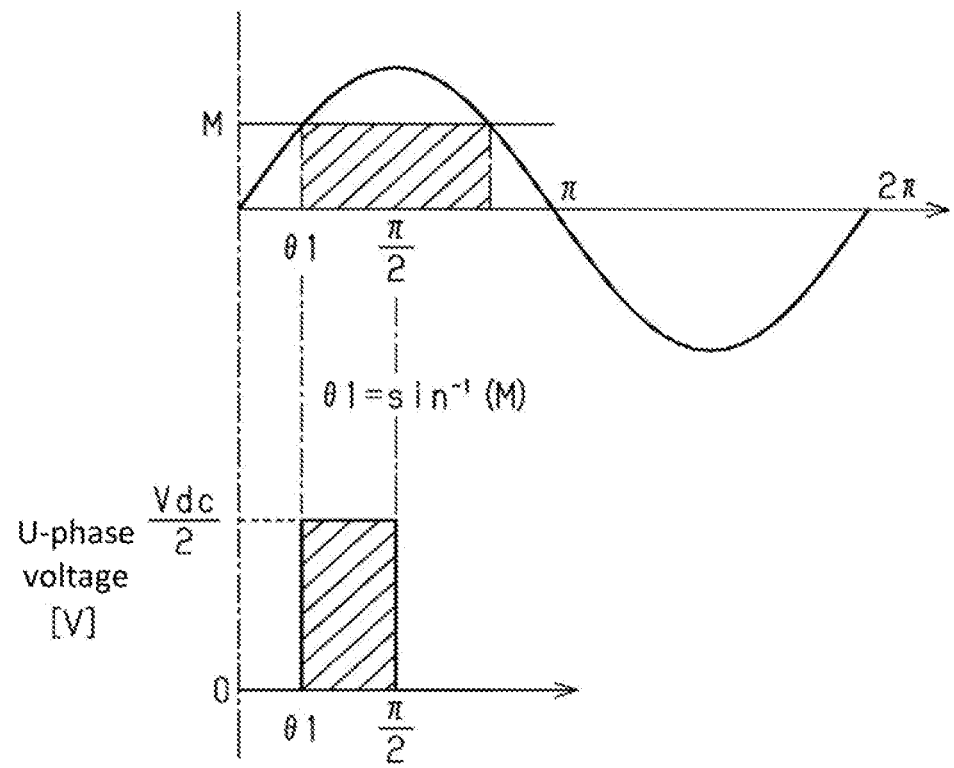
FIG. 15 is a figure to explain the fifth embodiment.

As illustrated in FIG. 15, the pulse width is $\pi/2 - \sin^{-1}(M)$ in the range of the electric angle 0 to $\pi/2$, and $\pi - 2\sin^{-1}(M)$ in the range of the electric angle 0 to $\pi$, so that the effective phase voltage is given as the following equation (6).

[Equation 6]

$$V_{phase\_rms} = \frac{\sqrt{2} \times V_{dc}}{3}\sqrt{\frac{\pi - 2\sin^{-1}(M)}{\pi}} \quad (6)$$

The equation (6) is transformed into the equation (5).

In the present embodiment, the modulation voltage generation unit 91 as the second calculation unit includes the effective line voltage/effective phase voltage calculation unit 91a that calculates the effective phase voltage Vphase-rms from the effective line voltage Vline-rms, and the modulation voltage computing unit 91b that computes the modulation voltage M from the effective phase voltage Vphase-rms calculated by the effective line voltage/effective phase voltage calculation unit 91a and the DC voltage Vdc by using the mathematical expression.

Thus, the modulation voltage M is calculated by the computing operation, so that a data storage capacity of table data, characteristic map data, and an approximate expression, that is, a memory capacity may be reduced. In addition, computational load may be reduced. For example, although an interpolation processing is required when the characteristic map is used to obtain the modulation voltage M, the computational load may be reduced by using the mathematical expression.

The present invention is not limited to the embodiments described above. For example, the present invention may be embodied as described below.

The DC voltage Vdc in the fourth embodiment and the fifth embodiment is a measured voltage. However, the DC voltage Vdc may be a constant voltage. In other word, the DC voltage Vdc may be a rated voltage (specification voltage) of the battery B.

As illustrated in FIG. 2 of the first embodiment, the modulation voltage generation unit 55 receives the effective line voltage Vine-rms, and generates the modulation voltage M by using the characteristic map. Instead of this configuration, as described in the fourth embodiment and the fifth embodiment, the modulation voltage generation unit as the second calculation unit may include the effective line voltage/effective phase voltage calculation unit that calculates the effective phase voltage Vphase-rms from the effective line voltage Vline-rms, and the modulation voltage computing unit that computes the modulation voltage M from the effective phase voltage Vphase-rms calculated by the effective line voltage/effective phase voltage calculation unit and the DC voltage Vdc by using the mathematical expression.

Thus, the modulation voltage M is calculated by the computing operation, so that a data storage capacity of table data, characteristic map data, and an approximate expression, that is, a memory capacity may be reduced. In addition, computational load may be reduced. For example, although an interpolation processing is required when the characteristic map is used to obtain the modulation voltage M, the computational load may be reduced by using the mathematical expression.

IGBTs are used as the six switching elements Q1 to Q6 of the inverter circuit 20. However, power MOSFETs may be used instead of the IGBTs.

REFERENCE SIGNS LIST 10 inverter device
20 inverter circuit
50 d, q/u, v, w transformation unit
51 scaling unit
52 comparator
53 effective line voltage calculation unit
54 phase peak voltage calculation unit
55 modulation voltage generation unit
70 triangle wave generator
71 comparator
72 effective line voltage calculation unit
73 modulation voltage generation unit
80 sine wave generator
81 comparator
83 modulation voltage generation unit
90 modulation voltage generation unit
90a effective line voltage/effective phase voltage calculation unit
90b modulation voltage computing unit
91 modulation voltage generation unit
91a effective line voltage/effective phase voltage calculation unit
91b modulation voltage computing unit
Ln negative bus
Lp positive bus
Q1 U-phase upper arm switching element
Q2 U-phase lower arm switching element
Q3 V-phase upper arm switching element
Q4 V-phase lower arm switching element
Q5 W-phase upper arm switching element
Q6 W-phase lower arm switching element
Vd* d-axis command voltage
Vq* q-axis command voltage Vu** command voltage
Vv** command voltage
Vw** command voltage
Vdc DC voltage
θ electric angle

The invention claimed is:

1. An inverter device comprising:
an inverter circuit that has switching elements connected between a negative bus and a positive bus and configuring an upper arm and a lower arm of each of U, V, W-phases, the inverter circuit converting a DC voltage to an AC voltage by switching operation of the switching elements and supplying the AC voltage to a motor;
a signal generator that generates signals having waveforms corresponding to signals of U, V, W-phase command voltages on the basis of information of an angle, a d-axis command voltage, and a q-axis command voltage;
a first calculation unit that receives signals of the d-axis command voltage and the q-axis command voltage, and calculates an effective line voltage;
a second calculation unit that receives the effective line voltage calculated by the first calculation unit, and generates a modulation voltage every control period; and
a comparison unit that compares the signals having the waveforms corresponding to the signals of the U, V, W-phase command voltages generated by the signal generator with signals of the modulation voltage generated by the second calculation unit every control period, and outputs signals having pulse patterns which operate the switching elements of the upper arm and the switching element of the lower arm in the inverter circuit.

2. The inverter device according to claim 1, wherein the signal generator has:
a d, q/u, v, w transformation unit that performs a coordinate transformation from a two-phase system (d, q) with the d-axis command voltage and the q-axis command voltage to a three-phase system (u, v, w) with the U, V, W-phase command voltages on the basis of the information of the angle; and
a scaling unit that scales the signals of the U, V, W-phase command voltages by a phase peak voltage of the U, V, W-phase command voltages having the effective line voltage in a range of −1 to +1,
the second calculation unit generates signals of a positive modulation voltage in a range of 0 to 1 and a negative modulation voltage in a range of −1 to 0, and
the comparison unit compares the signals of U, V, W-phase command voltage scaled by the phase peak voltage of the U, V, W-phase command voltage having the effective line voltage in the range of −1 to +1 with the signals of the positive modulation voltage in the range of 0 to 1 and the negative modulation voltage in the range of −1 to 0, and outputs the signals having the pulse patterns which operate the switching elements of the upper arm and indicate a comparison result of magnitude of the signals of the scaled U, V, W-phase command voltages and the positive modulation voltage in the range of 0 to +1, and the signals having the pulse patterns which operate the switching elements of the lower arm and indicate a comparison result of magnitude of the signals of the scaled U, V, W-phase command voltages and the negative modulation voltage in the range of −1 to 0.

3. The inverter device according to claim 2, wherein the second calculation unit has:
an effective line voltage/effective phase voltage calculation unit that calculates the effective phase voltage from the effective line voltage; and
a modulation voltage computing unit that computes the modulation voltage from the effective phase voltage calculated by the effective line voltage/effective phase voltage calculation unit and the DC voltage by using a mathematical expression.

4. The inverter device according to claim 1, wherein
the signal generator generates the signals of the U, V, W-phases each having a waveform of a triangle wave, with an amplitude of 1, on the basis of the information of the angle, the d-axis command voltage, and the q-axis command voltage,
the second calculation unit generates signals of a positive modulation voltage in a range of 0 to 1 and a negative modulation voltage in a range of −1 to 0, and
the comparison unit compares the signals of the generated triangle wave with the signals of the positive modulation voltage in the range of 0 to 1 and the negative modulation voltage in the range of −1 to 0, and outputs the signals having the pulse patterns which operate the switching elements of the upper arm and indicate a comparison result of magnitude of the signals of the generated triangle wave and the positive modulation voltage in the range of 0 to +1, and the signals of the pulse patterns which operate the switching elements of the lower arm and indicate a comparison result of magnitude of the signals of the generated triangle wave and the negative modulation voltage in the range of −1 to 0.

5. The inverter device according to claim 4, wherein the second calculation unit has:
an effective line voltage/effective phase voltage calculation unit that calculates the effective phase voltage from the effective line voltage; and
a modulation voltage computing unit that computes the modulation voltage from the effective phase voltage calculated by the effective line voltage/effective phase voltage calculation unit and the DC voltage by using a mathematical expression.

6. The inverter device according to claim 1, wherein
the signal generator generates the signals of the U, V, W-phases each having a waveform of a sine wave, with an amplitude of 1, on the basis of the information of the angle, the d-axis command voltage, and the q-axis command voltage,
the second calculation unit generates signals of a positive modulation voltage in a range of 0 to 1 and a negative modulation voltage in a range of −1 to 0, and
the comparison unit compares the signals of the generated sine wave with the signals of the positive modulation voltage in the range of 0 to 1 and the negative modulation voltage in the range of −1 to 0, and outputs the signals having the pulse patterns which operate the switching elements of the upper arm and indicate a comparison result of magnitude of the signals of the generated sine wave and the positive modulation voltage in the range of 0 to +1, and the signals of the pulse patterns which operate the switching elements of the lower arm and indicate a comparison result of magnitude of the signals of the generated sine wave and the negative modulation voltage in the range of −1 to 0.

7. The inverter device according to claim 6, wherein the second calculation unit has:
- an effective line voltage/effective phase voltage calculation unit that calculates the effective phase voltage from the effective line voltage; and
- a modulation voltage computing unit that computes the modulation voltage from the effective phase voltage calculated by the effective line voltage/effective phase voltage calculation unit and the DC voltage by using a mathematical expression.

* * * * *